US011733960B1

(12) United States Patent
Karol et al.

(10) Patent No.: US 11,733,960 B1
(45) Date of Patent: Aug. 22, 2023

(54) VEHICLE WARNING SIGNAL EMISSION

(71) Applicant: Zoox, Inc., Foster City, CA (US)

(72) Inventors: Kevin Mark Karol, San Francisco, CA (US); Andrew E. Beller, San Francisco, CA (US); Jacob Avi Harper, Alameda, CA (US); Turhan Karadeniz, Oakland, CA (US); George Dalman Nelson, III, San Francisco, CA (US); Lowell Ray Pickett, Oakland, CA (US); Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 51 days.

(21) Appl. No.: 16/685,854

(22) Filed: Nov. 15, 2019

(51) Int. Cl.
| | |
|---|---|
| *G06F 3/16* | (2006.01) |
| *B60Q 5/00* | (2006.01) |
| *G08G 1/16* | (2006.01) |
| *H04R 3/04* | (2006.01) |
| *H04R 1/02* | (2006.01) |
| *G05D 1/02* | (2020.01) |

(52) U.S. Cl.
CPC .................. *G06F 3/165* (2013.01); *B60Q 5/00* (2013.01); *G08G 1/166* (2013.01); *H04R 1/025* (2013.01); *H04R 3/04* (2013.01); *G05D 1/0212* (2013.01); *H04R 2430/01* (2013.01); *H04R 2499/13* (2013.01)

(58) Field of Classification Search
CPC ... G06F 3/165; B60Q 5/00; G08G 1/166; H04R 1/025; H04R 3/04; G05D 1/0212; H04R 2430/01; H04R 2499/13
See application file for complete search history.

(56) References Cited

U.S. PATENT DOCUMENTS

| | | | | |
|---|---|---|---|---|
| 9,517,767 | B1* | 12/2016 | Kentley et al. | .. B60R 21/01546 |
| 2016/0355181 | A1* | 12/2016 | Morales Teraoka et al. | G06K 9/00369 |
| 2017/0120814 | A1* | 5/2017 | Kentley et al. | ........ B60Q 5/008 |
| 2017/0123754 | A1* | 5/2017 | Kwon | ................... G10K 15/02 |
| 2017/0132934 | A1* | 5/2017 | Kentley et al. | ........ G08G 1/202 |
| 2018/0050635 | A1* | 2/2018 | Vincent et al. | ........ B60Q 9/008 |
| 2018/0118106 | A1* | 5/2018 | You et al. | .......... G06K 9/00791 |
| 2018/0334096 | A1* | 11/2018 | Yamamoto et al. | ...... B60Q 5/00 |
| 2019/0113914 | A1* | 4/2019 | Abe et al. | ............ G05D 1/0061 |
| 2019/0184893 | A1* | 6/2019 | Sorokin | ................. B60Q 1/525 |

FOREIGN PATENT DOCUMENTS

DE  102009057683 A1*  6/2011 ................. B60Q 5/008

* cited by examiner

*Primary Examiner* — Munear T Akki
(74) *Attorney, Agent, or Firm* — Lee & Hayes, P.C.

(57) ABSTRACT

A vehicle computing system may implement techniques to emit warning sounds from a vehicle to notify other entities in an environment with the vehicle of the vehicle operation. A vehicle computing system may be configured to emit warning sounds based on a speed associated with the vehicle. The vehicle computing system may determine a planned vehicle trajectory and that a speed corresponding to the planned vehicle trajectory is associated with the warning sound emission. The vehicle computing system may determine a time that the vehicle will be at the speed and may emit the warning sound substantially at the time. In some examples, the vehicle computing system may emit a different sound prior to the time and may transition to the warning sound associated with the speed at the time. By warning other entities of the vehicle operation, the warning sound emission system may improve the safety of vehicle operation.

20 Claims, 8 Drawing Sheets

VEHICLE WARNING SIGNAL EMISSION

BACKGROUND

Many vehicles are configured to emit warning sounds to alert pedestrians, bicyclists, and other operators to their presence in an environment. In some jurisdictions, certain vehicles, such as electric vehicles, may be required to emit warning sounds continuously below a particular speed due to a reduced operational noise of the vehicles. Such vehicles may be equipped to start emitting the warning sound at the particular speed. However, if a vehicle decelerates rapidly, a delay in emitting the warning sound, such as due to signaling latency, may cause the vehicle to operate unsafely by not providing the necessary warning signal to others in the environment. Additionally in some jurisdictions, the failure to properly emit the warning sound may cause the vehicle to be out of legal compliance.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
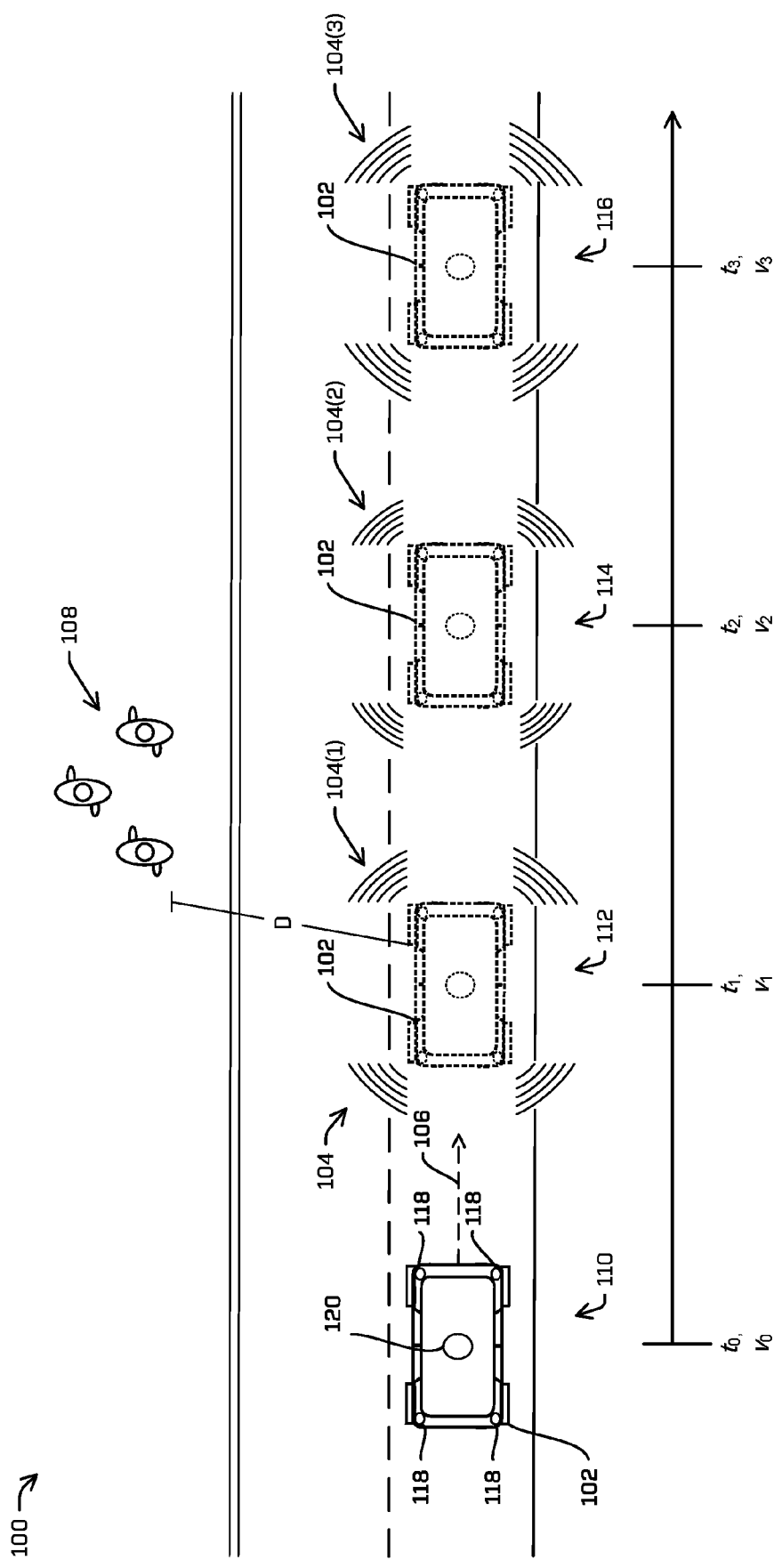
FIG. 1 is an illustration of a vehicle in an environment in which a warning signal emission system of the vehicle may determine to emit a warning signal based on a trajectory of the vehicle.

This disclosure is directed to techniques for improving vehicle warning systems. The vehicle warning systems may be configured to emit a signal (e.g., sound, light, etc.) to warn objects (e.g., dynamic object) in an environment proximate the vehicle of the vehicle operation in the environment. The vehicle may include an autonomous, semi-autonomous, or manually operated vehicle. The objects may include pedestrians, bicyclists, other vehicles (e.g., cars, trucks, motorcycles, mopeds, etc.), or any other object that may potentially be located proximate the vehicle. A vehicle computing system may be configured to determine a planned vehicle trajectory associated with the vehicle operation at a future time. The planned vehicle trajectory may include a direction of travel and one or more speeds associated with planned movement of the vehicle. Based on a determination that a speed associated with the vehicle trajectory will be at or below a threshold speed at a particular time, the vehicle computing system may cause the emitter to emit the warning signal at the particular time. The vehicle computing system may continue to emit the warning signal until the speed is above the threshold speed or the speed is zero for a threshold time, thereby maximizing safe operation of the vehicle.

The planned vehicle trajectory may be based on a route from a location to a destination. The planned vehicle trajectory may include one or more speeds, a speed modification (e.g., acceleration or deceleration associated with traffic lights, stop signs, yielding for objects, etc.), position changes (e.g., change position in a lane, change lanes, etc.), direction of travel (e.g., continuing in a direction, turning, etc.), or the like. For example, the vehicle computing system may determine a planned vehicle trajectory associated with a vehicle slowing to a stop approaching a stop sign.

In various examples, the vehicle computing system may determine that a speed (e.g., 30 kilometers per hour, 20 kilometers per hour, 20 miles per hour, 15 miles per hour, etc.) associated with the planned vehicle trajectory corresponds to a warning signal (e.g., warning sound, signal, etc.). The warning signal may include a sound emitted to alert objects in the environment of the vehicle operation. In at least one example, the warning signal may be an electric vehicle warning sound, such as that mandated by law and/or regulation in certain jurisdictions. In various examples, the warning signal may include one or more frequencies and one or more volumes. In some example, the frequenc(ies) and/or volume(s) may be associated with different speeds. For example, a first warning signal associated with a first speed (e.g., 18.6 miles per hour) may include a first frequency and a first volume and a second warning signal associated with a second speed (e.g., 12.4 miles per hour) may include a first frequency and a second volume. For another example, a first warning signal associated with a first speed may include a first frequency and a first volume and a second warning signal associated with a second speed may include a second frequency and a second volume.

In various examples, the vehicle computing system may determine a time associated with the speed corresponding to the warning signal and may emit the warning signal based on the time. The time associated with speed may include a time at which the vehicle, being controlled based on the planned vehicle trajectory, will be at the speed. In various examples, the vehicle computing system may start emitting the warning signal at the time. In some examples, the vehicle computing system may start emitting the warning signal at a low volume and may build the volume to the volume associated with the speed at the time. In such an example, the vehicle computing system may crescendo into the warning signal. In various examples, the vehicle computing system may crescendo to a volume above the volume associated with the speed at the time and may decrease the volume to the volume associated with the speed after the time.

In various examples, the vehicle computing system may start emitting the warning signal an interval (e.g., 3 seconds, 5 seconds, etc.) before the time. In such examples, the vehicle computing system may give prior warning to the vehicle operating at the speed. For example, a vehicle may be at a stop. The vehicle computing system may determine that a planned vehicle trajectory includes vehicle movement at a time 10 seconds in the future. The vehicle computing system may determine to start emitting a warning signal to alert objects in the area of vehicle movement at six seconds in the future, four seconds prior to movement, such as to provide advanced warning of vehicle operation. Though this is merely an example, and any other time periods are contemplated herein.

In various examples, the vehicle computing system may be configured to emit different warning signals based on the planned vehicle trajectory. In some examples, the different warning signals may include different frequencies and/or volumes that correspond to different speeds. In some examples, the frequencies and/or the volumes may correspond to legally and/or regulatorily mandated sounds to be emitted at particular speeds. In various examples, the vehicle computing system may determine, based on the planned vehicle trajectory, times associated with the speeds and may emit modified warning signals at each speed based on the times. For example, the vehicle computing system may determine, based on a planned vehicle trajectory, a first time associated with a first speed corresponding to a first warning signal and a second time associated with a second speed corresponding to a second warning signal. The vehicle computing system may emit the first warning signal at an associated first volume based on the first time and may modify the warning signal to emit the second warning signal at an associated second volume based on the second time. By emitting the warning signals associated with the speeds, the vehicle computing system may be configured to effectively alert objects in the environment of the vehicle operation.

In various examples, the vehicle computing system may detect the objects in the environment. In some examples, the objects may be detected based on sensor data from sensors (e.g., cameras, motion detectors, lidar, radar, etc.) of the vehicle. In some examples, the objects may be detected based on sensor data received from remote sensors, such as, for example, sensors associated with another vehicle or sensors mounted in an environment that are configured to share data with a plurality of vehicles. In various examples, the vehicle computing system may determine the planned vehicle trajectory based in part on the detected objects. For example, the vehicle computing system may detect an object in the environment and may determine that that vehicle should yield to the object. Based on a determination to yield, the vehicle computing system may determine the planned vehicle trajectory including a deceleration rate to slow the vehicle and yield to the object.

In some examples, the vehicle computing system may be configured to emit a first warning signal toward a detected object. In such examples, the first warning signal may include a sound and/or light directed at the detected object to specifically alert the detected object of the vehicle operation. In some examples, the vehicle computing system may cause the first warning signal to be emitted based on a determination that the detected object is relevant to the vehicle (e.g., a potential conflict between the vehicle and object may exist, object may potentially slow forward progress of the vehicle). In various examples, the vehicle computing system may be configured to determine relevance of an object utilizing the techniques described in U.S. Pat. Application Serial No. 16/193,945, filed Nov. 16, 2018 and entitled "Dynamic Sound Emission for Vehicles," the entire contents of which are incorporated herein by reference. In some examples, the determination of object relevance may be based on a location associated with the object being within a threshold distance of a path of the vehicle. In such examples, the path may correspond to a drivable surface over which the vehicle plans to travel from a first location to a destination. In some examples, the determination of object relevance may be based on a potential trajectory of the object intersecting the planned vehicle trajectory. In such examples, the vehicle computing system may determine the potential object trajectory based on the sensor data.

In various examples, the trajectory and/or intent of an object may be determined utilizing techniques described in U.S. Pat. No. 10,414,395, issued Sep. 17, 2019 and entitled "Feature-Based Prediction," the entire contents of which are incorporated herein by reference. For example, the vehicle computing system may detect a pedestrian jaywalking in the road ahead of the vehicle. The vehicle computing system may determine that the pedestrian trajectory may conflict with the planned vehicle trajectory, such that, absent a modification to one or both trajectories, a collision between the vehicle and the pedestrian could occur. The vehicle computing system may cause the first warning signal to be emitted to warn the pedestrian of the vehicle operation on the road. In some examples, the vehicle computing system may cause the first warning signal to be emitted concurrently with or immediately prior to modifying the planned vehicle trajectory (e.g., yielding to the pedestrian), such as to maximize safe operation of the vehicle.

In some examples, the vehicle computing system may determine a modified trajectory, such as to slow the vehicle to yield to the detected object. Based on a determination that the modified trajectory includes a speed associated with a warning signal, the vehicle computing system may determine a time associated with the speed. In some examples, the vehicle computing system may cause a frequency and/or volume of the first warning signal to be modified into a second warning signal associated with the speed. In such examples, the first warning signal (directed toward the detected object) and the second warning signal may be emitted via the same emitters. In some examples, the vehicle computing system may emit the first warning signal via first emitters and the second warning signal via second emitters. In such examples, the vehicle computing system may be configured to emit the first and the second warning signals concurrently.

The techniques described herein may substantially improve the safe operation of autonomous and semi-autonomous vehicle operating in an environment. An increasing number of vehicles are electrically powered and powered via other means that produce less noise than a traditional combustion engine. To increase awareness and thus safety of the autonomous, semi-autonomous, and/or manned vehicles, the techniques described herein utilize knowledge of the planned vehicle trajectory to ensure the vehicle is emitting a warning signal to alert the objects in the environment of the vehicle operation and/or presence. The vehicle computing system may continue to modify (e.g., iteratively modify) the warning signals based on changes to the speed determined by the planned vehicle trajectory, to maximize safe operation of the vehicle in the environment.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system including human/machine interaction. Additionally, the techniques described herein may be used with real data (e.g., captured using sensor(s)), simulated data (e.g., generated by a simulator), or any combination of the two.

FIG. 1 is an illustration of a vehicle 102 in an environment 100 in which a vehicle computing system of the vehicle 102 emit a warning signal 104 based on a planned vehicle trajectory 106 (e.g., vehicle trajectory 106), such as to alert one or more objects 108 of the presence and/or operation of the vehicle 102. The vehicle 102 may include an autonomous vehicle, a semi-autonomous vehicle, and/or a manned vehicle.

In various the vehicle computing system may determine, at an initial time ($t_0$), a vehicle trajectory 106 associated with future movement of the vehicle 102. The vehicle trajectory 106 may represent a way in which the vehicle 102 plans to travel through the environment 100 from an initial location 110 to a destination (not shown). In various examples, the vehicle trajectory 106 may include a speed, a speed modification (e.g., acceleration or deceleration associated with traffic lights, stop signs, yielding for objects, etc.), position changes (e.g., change position in a lane, change lanes, etc.), direction of travel (e.g., continuing in a direction, turning, etc.), and the like. As illustrated in FIG. 1, the vehicle 102 traveling along the trajectory 106 may be at a first location 112 at a first time ($t_1$), a second location 114 at a second time ($t_2$), and a third location 116 at a third time ($t_3$). Though illustrated as being substantially a same distance apart, the first location 112, the second location 114, and the third location 116 may be different distances, based on the speeds associated with vehicle trajectory 106, such as in an acceleration and/or deceleration.

In various examples, the vehicle computing system may determine that a speed (e.g., 30 kilometers per hour, 20 kilometers per hour, 20 miles per hour, 15 miles per hour, etc.) associated with the vehicle trajectory 106 corresponds to a warning signal 104 (e.g., warning sound, signal, etc.), such as first warning signal 104(1). The warning signal 104 may include a sound emitted to alert objects 108 in the environment 100 of the vehicle 102 operation. In at least one example, the warning signal 104 may include an electric vehicle warning sound, such as that mandated by law and/or regulation in various jurisdictions. In various examples, the warning signal 104 may include one or more frequencies and one or more volumes. In some example, the frequenc(ies) and/or volume(s) may be associated the speed. For example, a first warning signal 104(1) associated with a first speed ($v_1$) at the first time ($t_1$) may include a first frequency and a first volume and a second warning signal 104(2) associated with a second speed ($v_2$) at a second time ($t_2$) may include the first frequency and a second volume.

In various examples, the frequenc(ies) and/or volume(s) may be predetermined, such as based on the vehicle speed. In some examples, the frequenc(ies) and/or volume(s) associated with different speeds may be stored on a datastore associated with the vehicle computing system and/or stored on a remote computing device and accessible to the vehicle computing system. In some examples, the frequenc(ies) and/or volume(s) may be determined dynamically, such as based on one or more real-time conditions associated with the environment 100. The real-time conditions may include environmental conditions (e.g., noise level in the environment 100, amount of traffic, road conditions, etc.), weather conditions (e.g., rain, snow, hail, wind, etc.), vehicular considerations (e.g., passengers in the vehicle 102, etc.), and the like.

In some examples, the vehicle computing system may access the predetermined frequenc(ies) and/or volume(s) associated with a warning signal and may modify the predetermined frequenc(ies) and/or volume(s) based on the real-time conditions. For example, the vehicle computing system may determine that a first warning signal 104(1) associated with a speed ($v_1$) includes a first frequency and a first volume. Based on a determination that a noise level in the environment 100 is above a threshold volume, the vehicle computing system may increase the volume associated with the first warning signal 104(1). For another example, the vehicle computing system may determine that a first warning signal 104(1) associated with a speed ($v_1$) includes a first frequency and a first volume. Based on a determination that a weather condition includes rain, the vehicle computing system may increase the volume associated with the first warning signal 104(1).

In various examples, the vehicle computing system may determine a time associated with the speed corresponding to the warning signal 104. The time may be determined based on a rate of speed change (acceleration/deceleration) from the initial location 110 and/or an initial speed associated with the initial location 110. As a nonlimiting example, the vehicle computing system may determine that a first speed associated with a warning signal is 18.6 miles per hour. The vehicle computing system may determine that, at the initial location 110, the vehicle trajectory includes an initial speed of 25 miles per hour and a deceleration rate of 5 miles per hour per hour, such that the vehicle 102 will be traveling 18.6 miles per hour at the first location 112 at the first time ($t_1$).

Based on the time associated with the speed, as determined by the vehicle trajectory 106, the vehicle computing system may emit a first warning signal 104(1) via one or more emitters 118 and/or 120 (e.g., emitters). The emitter(s) 118 may be oriented to emit outward from an area of the vehicle 102 to which they are associated. In some examples, the emitter(s) 120 may include an omnidirectional emitter. In such examples, the emitter(s) 120 may be configured to emit a signal in all directions around the vehicle. In some examples, the emitter(s) 120 may include a plurality of emitters, each facing a slightly different direction. In such examples, the emitter(s) 120 may be configured to emit one or more signals in different directions around the vehicle. In various examples, the emitter(s) 118 and/or 120 may include speakers dedicated to the warning signals 104. In some examples, the emitter(s) 118 and/or 120 may be configured to emit the warning signals 104 as well as other sounds, such as other audio signals directed at particular targets, such as those described below with respect to FIG. 2.

In various examples, the first warning signal 104(1) may include a first frequency (or set of frequencies) and a first volume (or set of volumes). As used herein, a frequency may represent a set of one or more frequencies and a volume may represent a set of one or more volumes. In various examples, the vehicle computing system may start emitting the first warning signal 104(1) at the first volume substantially at the first time ($t_1$) associated with the speed. In some examples, the vehicle computing system may start emitting the first warning signal 104(1) at an interval (e.g., 5 seconds, 7 seconds, etc.) prior to the first time ($t_1$) at a low volume and may build the volume of the first warning signal 104(1) to crescendo at the first time ($t_1$). In such examples, the vehicle computing system may increase awareness of the vehicle 102 with a harmonious volume increase to the first warning signal 104(1). For example, a vehicle trajectory 106 may include a deceleration to a speed associated with the first warning signal 104(1) at the first time ($t_1$). The vehicle computing system may determine to start emitting the first warning signal 104(1) at a three second interval prior to the first time ($t_1$) and may increase volume over the three second interval to crescendo at the first time ($t_1$).

In some examples, the vehicle computing system may start emitting the first warning signal 104(1) at the interval prior to the first time ($t_1$) at the volume associated with the speed. In such an example, the vehicle computing system may ensure that the first warning signal 104(1) is being emitted at the speed associated therewith. For example, the vehicle trajectory 106 may include an acceleration from a (stopped) initial location 110. The vehicle computing system may determine to begin emitting the first warning signal 104(1) at a 5 second interval prior to movement, the movement (speed) being associated with the first warning signal 104(1). In such an example, the initial location 110 and the first location 112 may be the same position.

In some examples, the vehicle computing system may cause the first warning signal 104(1) to crescendo to a volume associated with the first speed ($v_1$), such as that associated with a legally or regulatorily mandated electric vehicle warning sound. In some examples, the first warning signal 104(1) may crescendo a volume above the volume associated with the speed. In such examples, the vehicle computing system may further increase awareness by emitting a sound louder than that required by law or regulation.

In various examples, the vehicle computing system may be configured to determine a signaling delay (e.g., 0.3 seconds, 0.7 seconds, etc.) associated with causing the vehicle to slow to the speed associated with the warning signal 104. In such examples, the signaling delay may be associated with a time between sending the signal from the vehicle computing system to a change in one or more drive modules associated with effecting the speed change. In some examples, the vehicle computing system may send the signal to start emitting the first warning signal 104(1) (or a build-up thereto) based on the signaling delay.

In various examples, the vehicle computing system may determine that a second speed ($v_2$) of the vehicle trajectory 106 corresponds to a second warning signal 104(2) and a third speed ($v_3$) of the vehicle trajectory 106 corresponds to a third warning signal 104(3). The vehicle computing system may determine the second time ($t_2$) associated with the second warning signal 104(2) and the third time ($t_3$) associated with the third warning signal 104(3). In various examples, the vehicle computing system may modify the first frequency and/or the first volume of the first warning signal 104(1) to a second frequency and/or a second volume associated with the second warning signal 104(2). The vehicle computing system may modify the first frequency and/or the first volume such that the second frequency and/or the second volume is emitted at the second time ($t_2$) associated with second warning signal 104(2) (e.g., at the second speed ($v_2$). In the illustrative example, the second volume associated with the second warning signal 104(2) may include a volume lower volume than the first volume associated with the first warning signal 104(1). Though this is merely an illustration, and the second volume may be higher than the first volume.

In various examples, the vehicle computing system may modify the second frequency and/or the second volume of the second warning signal 104(2) to a third frequency and/or a third volume associated with the third warning signal 104(3). The vehicle computing system may modify the second frequency and/or the second volume such that the third warning signal 104(3) including the third frequency and/or the third volume is emitted at third time ($t_3$) associated with third warning signal 104(3) (e.g., at the third speed ($v_3$)). In the illustrative example, the third volume associated with the third warning signal 104(3) may include a volume higher volume than the second volume associated with the second warning signal 104(2). Though this is merely an illustration, and the third volume may be lower than the second volume.

Though described as being associated with a single vehicle trajectory 106 including a first speed ($v_1$), a second speed ($v_2$), and a third speed ($v_3$), it is understood that the vehicle computing system may determine multiple trajectories 106 associated with vehicle 102 travel through the environment and that the speeds ($v_1$), ($v_2$), and ($v_3$) described above may be associated with a same or different trajectories. For example, the vehicle computing system may determine a first trajectory including a first speed ($v_1$) that corresponds to the first warning signal 104(1), a second trajectory including a second speed ($v_2$) that corresponds to the second warning signal 104(2), and the like. In various examples, the vehicle computing system may periodically determine vehicle trajectories 106 and determine whether a speed associated therewith corresponds to a warning signal 104. In various examples, the emission and/or modification to the warning signals 104 may correspond to legal and/or regulatory compliance associated with the associated speeds.

Additionally or in the alternative, the vehicle computing system may determine to emit the warning signals 104 based on a detection of one or more objects 108 in the environment 100. The vehicle computing system(s) may detect the object(s) 108 based on sensor data captured by one or more sensors of the vehicle 102 and/or one or one or more remote sensors (e.g., sensors mounted on another vehicle 102 and/or mounted in the environment 100, such as for traffic monitoring, collision avoidance, or the like). The sensor(s) may include data captured by lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, time-of-flight sensors, environment sensors (e.g., temperature sensors, humidity sensors, light sensors, pressure sensors, etc.), and the like.

In some examples, the vehicle computing system may be configured to determine a classification associated with the object(s) 108 (e.g., car, truck, pedestrian, bicycle, motorcycle, animal, etc.). In various examples, the vehicle computing system may determine an object classification based on one or more features associated with the object(s) 108. The features may include a size (e.g., width, height, depth, etc.), shape (e.g., geometry, symmetry, etc.), and/or other distinguishing features of the object(s) 108. For example, the vehicle computing system may recognize a size and/or shape of a first object 108 corresponds to a pedestrian and a size and/or shape of another object 108, corresponds to a cyclist.

In various examples, the vehicle computing system may determine that a distance (D) between the vehicle 102 and an object 108 is less than a threshold distance. Based at least in part on the determination that the object 108 is within the threshold distance of the vehicle 102, the vehicle computing system may cause the first warning signal 104(1) to be emitted at the first time ($t_1$). In such examples, the first warning signal 104(1) may be emitted independent of a velocity determination (e.g., regardless of the first velocity ($v_1$)) to alert the object 108 of the vehicle operation and maximize safety associated therewith.

As will be discussed in greater detail below with respect to FIG. 2, the vehicle computing system may additionally or alternatively be configured to emit a discrete warning signal directed toward one or more objects 108, such as based on the threshold distance and/or based on a determination that the objects 108 are relevant to the vehicle 102.

Figure 2:
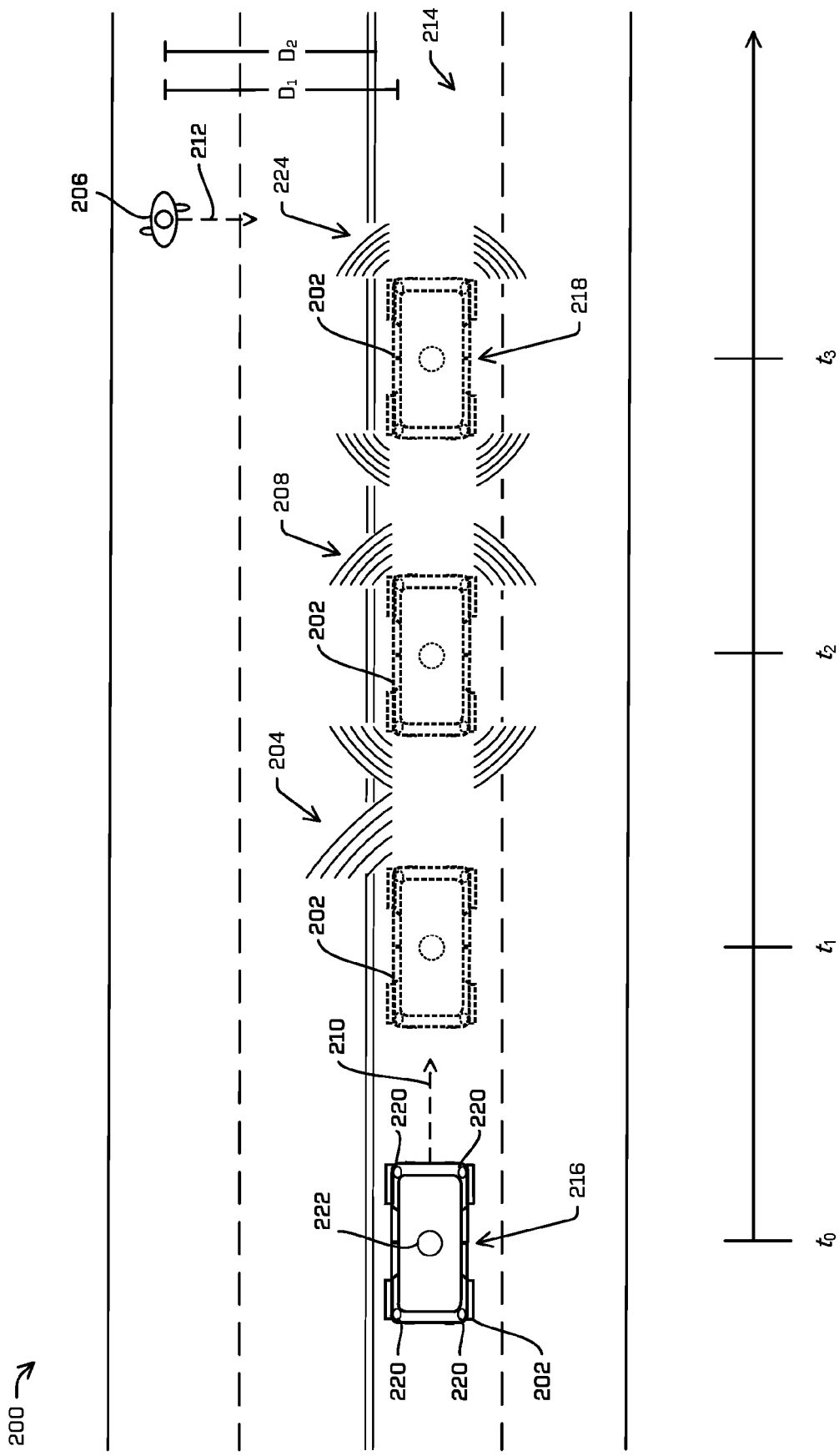
FIG. 2 is an illustration of a vehicle in an environment in which a warning signal emission system of the vehicle may emit a first warning signal based on a detected object and a second warning signal based on a trajectory of the vehicle.

FIG. 2 is an illustration of a vehicle 202, such as vehicle 102, in an environment 200, such as environment 100, in which a vehicle computing system of the vehicle 202 may emit a first warning signal 204 based on a detected object 206 (object 206) and a second warning signal 208 based on a planned vehicle trajectory 210 (e.g., vehicle trajectory 210), such as warning signal 104 based on the vehicle trajectory 106.

As discussed above, the vehicle computing system may detect the object 206 based on sensor data captured by one or more sensors on the vehicle 202 and/or one or more remote sensors (sensors mounted on another vehicle 202 and/or mounted in the environment 200). In various examples, the vehicle computing system may determine that a classification associated with the object 206, such as based on the features associated therewith. In various examples, the vehicle computing system may determine a trajectory 212 associated with the object 206. In some examples, the object trajectory 212 may be based on a top-down representation of an environment, such as by utilizing the techniques described in U.S. Pat. Application Serial No. 16/151,607, filed Oct. 4, 2018 and entitled "Trajectory Prediction on Top-Down Scenes," and in U.S. Pat. Application Serial No. 16/504,147, filed Jul. 5, 2019 and entitled "Prediction on Top-Down Scenes based on Action Data," the entire contents of which are incorporated herein by reference. In some examples, the object trajectory 212 may be determined using a probabilistic heat map (e.g., discretized probability distribution), tree search methods, temporal logic formulae, and/or machine learning techniques to predict object behavior, such as that described in U.S. Pat. Application Serial No. 15/807,521, filed Nov. 8, 2017, and entitled "Probabilistic Heat Maps for Behavior Prediction," the entire contents of which are incorporated herein by reference.

In various examples, the vehicle computing system may determine whether the object 206 is relevant to the vehicle (e.g., a potential conflict between the vehicle 202 and object 206 may exist, object 206 may potentially slow forward progress of the vehicle 202, etc.). In various examples, an object relevance may be determined utilizing the techniques described in U.S. Pat. Application Serial No. 16/389,720, filed Apr. 19, 2019, and entitled "Dynamic Object Relevance Determination," U.S. Pat. Application Serial No. 16/417,260, filed May 20, 2019, and entitled "Object Relevance Determination," and U.S. Pat. Application Serial No. 16/530,515, filed Aug. 02, 2019, and entitled "Relevant Object Detection," the entire contents of which are incorporated herein by reference.

In some examples, the object 206 may be relevant to the vehicle based on a determination that a distance ($D_1$) at a closest point of approach between the object 206 and the vehicle 202 traveling on the vehicle trajectory 210 is equal to or less than a first threshold distance (e.g., 10 feet, 4 meters). In some examples, the object 206 may be relevant to the vehicle 202 based on a determination that a second distance ($D_2$) between the object 206 and a drivable surface 214 (e.g., a roadway, lane in which the vehicle 202 operates, etc.) is less than a second threshold distance (e.g., 3 meters, 13 feet, etc.). In some examples, the first and second threshold distances may be based on the classification associated with the object 206.

In various examples, the object may be relevant to the vehicle 202 based on an object trajectory 212 associated therewith, such as if the vehicle trajectory 210 and the object trajectory 212 intersect and/or locations of the vehicle 202 and object 206 come within a threshold distance (e.g., 5 feet, 10 feet) of one another traveling on respective trajectories. For example, the vehicle computing system may determine that the object trajectory 212 and classification associated with the object 206 corresponds to that of a jaywalker potentially intending to cross in front of the vehicle 202 operating on the drivable surface 214. The vehicle computing system may determine that a potential conflict may occur between the vehicle 202 and the jaywalker (object 206), and therefore, may determine that the object 206 is relevant to the vehicle 202.

In various examples, based on a determination of relevance, the vehicle computing system may cause the first warning signal 204 to be emitted at a first time ($t_1$). The first warning signal may include an audio signal and/or a visual signal. The first warning signal may be emitted via one or more first emitters of the vehicle (e.g., one or more speakers, lights, etc.). The first warning signal may include a first set of characteristics, such as frequency, volume, luminosity, color, shape, motion, or the like. In some examples, the first set of characteristics may include a pre-determined set of characteristics. In various examples, the first warning signal 204 and/or the first set of characteristics may be determined dynamically utilizing the techniques described in U.S. Pat. Application No. 16/656,312, filed Oct. 17, 2019 and entitled "Dynamic Vehicle Warning Signal Emission," the entire contents of which are incorporated herein by reference.

In some examples, the vehicle computing system may cause the first warning signal 204 to be emitted toward the relevant object 206. In some examples, the first warning signal 204 may be emitted via one or more emitters 220 substantially facing a direction in which the object 206 is detected. For example, the object 206 may be detected ahead of and on a left side of the vehicle 202. Based on the detection of the object 206 ahead of and on the left side of the vehicle 202, the vehicle computing system may cause the first warning signal 204 to be emitted via an emitter 220 mounted on the front and left side of the vehicle 202. In some examples, the first warning signal 204 may be emitted toward the relevant object 206 utilizing beam steering and/or beamformed array techniques, such as that described in U.S. Pat. No. 9,878,664, issued May 4, 2017 and entitled "Method for Robotic Vehicle Communication with an External Environment via Acoustic Beam Forming," the entire contents of which are incorporated herein by reference.

In various examples, based at least in part on the determination of relevance and/or the object trajectory 212, the vehicle computing system may determine to yield to the object 206. In such examples, the vehicle trajectory 210 may be associated with the vehicle slowing (e.g., decreasing speed) from an initial position 216 to a stopped position 218 prior to an estimated location of the object 206 based on the object trajectory 212. Though illustrated as a deceleration from the initial position 216 to the stopped position 218, the vehicle trajectory 210 may additionally include a change in position in a lane, a lane change, or other modification associated with vehicle 202 travel through the environment 200.

In various examples, the vehicle computing system may determine that a second speed ($v_2$) associated with the vehicle trajectory 210 corresponds to a second warning signal 208. The second warning signal 208 may include a second set of characteristics (e.g., second frequency (or set of frequencies), a second volume (or set of volumes), etc.). In various examples, the second set of characteristics may include pre-determined frequenc(ies) and/or volume(s) associated with the second speed ($v_2$).

In various examples, the vehicle computing system may determine a second time ($t_2$) associated with the second speed ($v_2$) and may emit the second warning signal 208 based on the second time ($t_2$). In various examples, the vehicle computing system may be configured to emit the first warning signal 204 and the second warning signal 208 concurrently. In such examples, the first warning signal 204 and the second warning signal 208 may be emitted via different emitters 220 and/or 222. For example, the first warning signal 204 may be emitted via emitters 220, such as in a beamformed array directed toward the object 206, and the second warning signal 208 may be emitted via one or more emitters 222, or vice versa.

In various examples, the vehicle computing system may emit the first warning signal 204 and the second warning signal 208 via the same emitters 220 and/or emitter(s) 222. In some examples, the vehicle computing system may stop emitting the first warning signal 204 and may start emitting the second warning signal 208 substantially at the second time ($t_2$) associated with the second speed ($v_2$). In various examples, the vehicle computing system may transition from the first warning signal 204 to the second warning signal 208 at an interval (e.g., 5 seconds, 7 seconds, etc.) prior to the second time ($t_2$). In such an example, the vehicle computing system may modify the first set of characteristics (e.g., frequency and/or volume of the first warning signal 204) into the second set of characteristics (e.g., frequency and/or volume of the second warning signal 208). In various examples, the transition may include one or more changes to the frequency and/or volume of the first set of characteristics to smoothly transition from the first warning signal 204 to the second warning signal 208.

In various examples, the vehicle may determine that a third speed ($v_3$) of the vehicle trajectory 210 corresponds to a third warning signal 224. The third warning signal 224 may represent the second warning signal 208, modified based on a change in vehicle speed. The vehicle computing system may determine a third time ($t_3$) associated with the third warning signal 224. In various examples, the vehicle computing system may modify the second set of characteristics of the second warning signal 208 to a third set of characteristics (e.g., third frequency (set of frequencies) and/or a third volume (set of volumes)) associated with the third warning signal 224. The vehicle computing system may modify the second set of characteristics such that the third warning signal 224 including the third set of characteristics is emitted substantially at the third time ($t_3$). In the illustrative example, the third set of characteristics associated with the third warning signal 224 may include a lower volume than the second volume associated with the second set of characteristics. Though this is merely an illustration, and the third volume may be higher than the second volume. In at least one example, the third volume associated with the third warning signal 224 at the stopped position 218 may be zero.

In various examples, the transition between the second warning signal 208 and the third warning signal 224 may include continuous or periodic (e.g., every 0.2 seconds, etc.) change in volume from the second volume associated with the second set of characteristics to the third volume associated with the third set of characteristics. In some examples, the vehicle computing system may smoothly transition between the second warning signal 208 and the third warning signal 224. For example, the third volume associated with the stopped position 218 may be a zero volume (e.g., no sound emitted). The vehicle computing system may modify the second warning signal 208 to gradually decrease volume between the second time and the third time, to a zero volume at the third time. Thus, the vehicle computing system may cease emitting a warning signal at the stopped position 218. In some examples, the third volume associated with the stopped position 218 may include a low volume. In such examples, the vehicle computing system may be configured to decrease the volume to the low volume, such as to continue to alert the object 206 of the vehicle 202 operation.

Though described as being associated with a single vehicle trajectory 210 including a first speed ($v_1$), a second speed ($v_2$), and a third speed ($v_3$), it is understood that the vehicle computing system may determine multiple trajectories 210 associated with vehicle 202 travel through the environment and that the speeds ($v_1$), ($v_2$), and ($v_3$) described above may be associated with a same or different trajectories. In various examples, the vehicle computing system may periodically (e.g., every 0.1 second, 0.5 seconds, 2 seconds, etc.) determine vehicle trajectories 210 and determine whether a speed associated therewith corresponds to a warning signal 208 or 224. In various examples, the emission and/or modification to the warning signals 208 and/or 224 may correspond to legal and/or regulatory compliance associated with the associated speeds.

Figure 3:
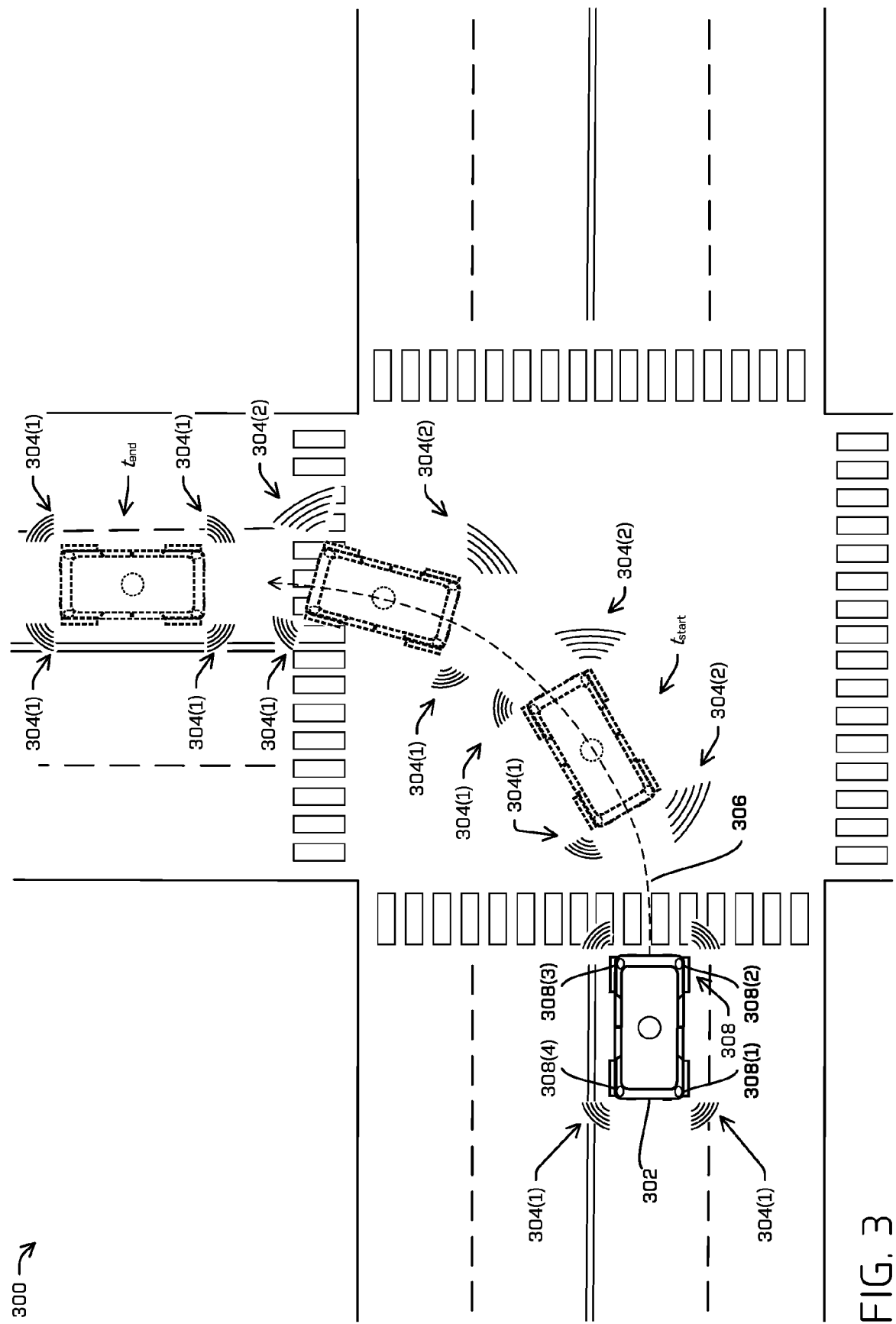
FIG. 3 is an illustration of a vehicle in an environment in which a warning signal emission system of the vehicle may emit two or more warning signals based on a trajectory of the vehicle.

FIG. 3 is an illustration of a vehicle 302 in an environment 300, such as vehicle 102 in the environment 100, in which a vehicle computing system of the vehicle 302 may emit two or more warning signals 304, such as warning signal 104, based on a planned vehicle trajectory 306 (e.g., vehicle trajectory 306), such as vehicle trajectory 106. In various examples, the vehicle computing system may determine to emit a first warning signal 304(1) based on the vehicle trajectory 306. As discussed above, a determination to emit the first warning signal 304(1) may be based on a speed associated with the vehicle 302. The first warning signal 304(1) may include a first set of characteristics, such as based on the speed. The first set of characteristics may include a first frequency (or set of frequencies) and a first volume (or set of volumes). In various examples, the first warning signal 304(1) may be emitted via one or more emitters 308.

In various examples, the vehicle computing system may determine that the vehicle trajectory 306 includes a change of direction, such as that resulting from a turn (e.g., left turn depicted in FIG. 3). Though shown as a 90 degree change of direction, such as from a first road to a second, intersecting road, the change of direction may include a greater or lesser angle. In various examples, the vehicle computing system may determine a start time associated with a beginning of the change of direction (e.g., start of the turn), depicted as $t_{start}$, based on the vehicle trajectory 306.

In some examples, the vehicle computing system may emit the first warning signal via one or more emitters 308, such as via emitters 308(1) and 308(2), and a second warning signal 304(2) via one or more other emitters 308, such as emitters 308(3) and 308(4), based on the start time ($t_{start}$). The second warning signal 304(2) may include a second set of characteristics. The second set of characteristics may include a second frequency (or set of frequencies) and a second volume (or set of volumes). In at least one example, the second frequency may be a same frequency (or set of frequencies) as the first frequency and the second volume may be a louder volume than the first frequency. In such an example, the vehicle computing system may emit a louder warning signal 304 on one side of the vehicle and a less loud warning signal 304(1) on the other side of the vehicle. In such an example, the difference in volume may improve an auditory awareness of the vehicle movement. While depicted in FIG. 3 as emitting a louder warning signal 304 on an outside of the turn, this is not meant to be so limiting and a louder warning signal 304 may be emitted via speakers on the inside of the turn (e.g., 308(3), 308(4)), at the front of the vehicle (e.g., 308(2), 308(3)), at a back of the vehicle (e.g., 308(1), 308(4)), or any other combination of emitters 308.

In various examples, the vehicle computing system may start modifying the first warning signal 304(1) emitted from a first emitter 308(1) and a second emitter 308(2) to the second warning signal 304(2) at an interval (e.g., 0.5 seconds, 1 second, etc.) prior to the start time ($t_{start}$) to emit the second warning signal 304(2) at the start time ($t_{start}$). In such an example, the vehicle computing system may smoothly increase a first volume of the first warning signal 304(1) to a second volume associated with the second warning signal 304(2) at the start time ($t_{start}$). In some examples, the vehicle computing system may modify the volume at the start time ($t_{start}$), such that a time before start time ($t_{start}$), the vehicle computing system emits the first warning signal 304(1) at the first volume and at the start time ($t_{start}$), the vehicle computing system emits the second warning signal 304(2) at the second volume.

In various examples, the vehicle computing system may determine an end time associated with an end of the change of direction (e.g., end of the turn), depicted as $t_{end}$, based on the vehicle trajectory 306. The vehicle computing system may cause the vehicle to emit the first warning signal 304(1) via the emitters 308, such as emitters 308(1), 308(2), 308(3), and 308(4) at the end time ($t_{end}$). In various examples, the vehicle computing device may continue to emit the first warning signal 304(1) until the vehicle trajectory includes a speed above a threshold speed, such as to no longer require the warning signal emission. In some examples, the vehicle computing device may continue to emit the first warning signal 304(1) until the vehicle stops movement (e.g., vehicle trajectory 306 with a zero speed). In various examples, the first warning signal 304(1) may be emitted until the vehicle trajectory 306 includes a zero speed for a threshold time (e.g., 10 seconds, 30 seconds, 1 minute, etc.).

Figure 4:
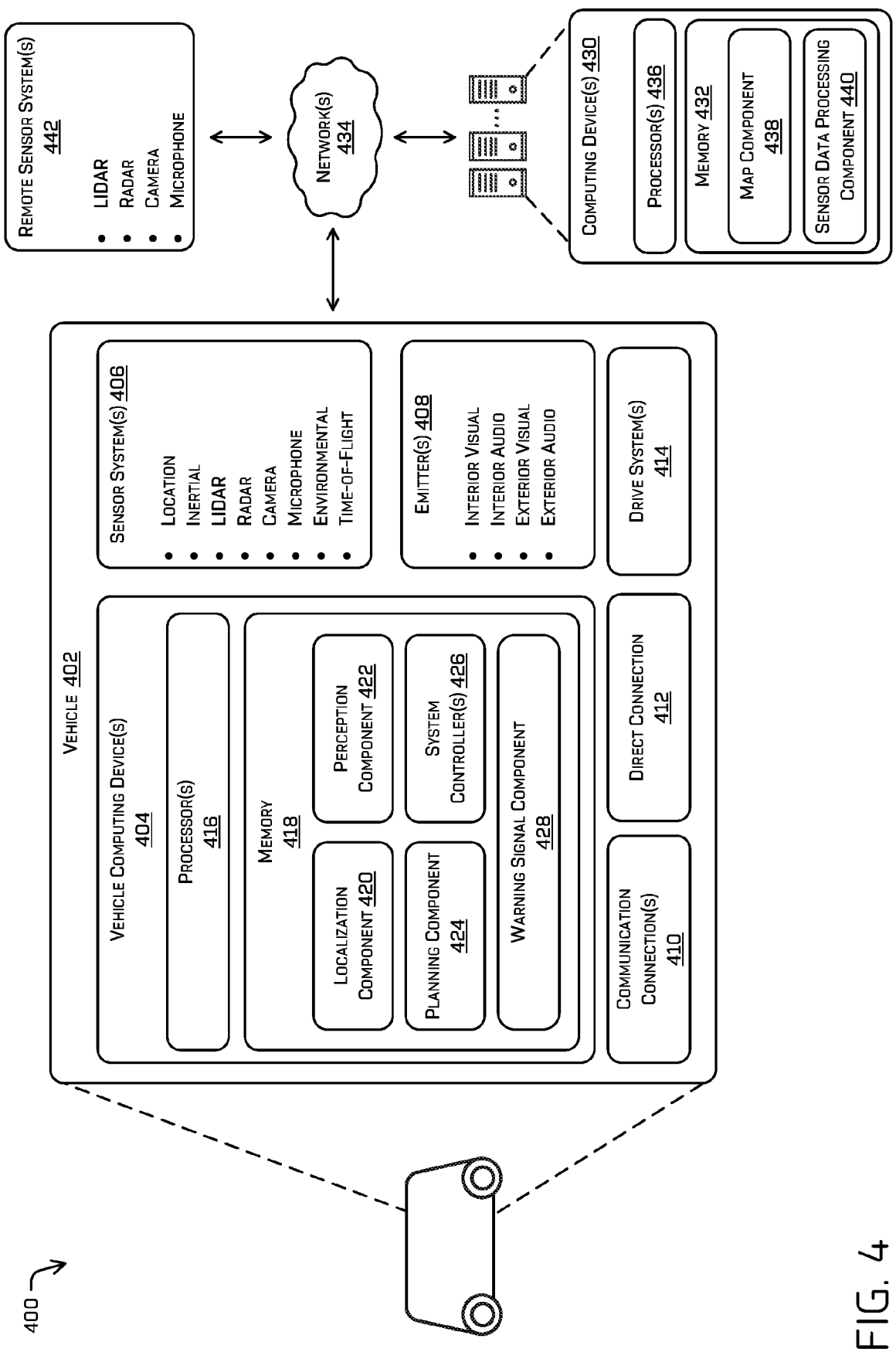
FIG. 4 is a block diagram of an example system for implementing the techniques described herein.

FIG. 4 is a block diagram of an example system 400 for implementing the techniques described herein. In at least one example, the system 400 may include a vehicle 402, such as vehicle 102.

The vehicle 402 may include one or more vehicle computing devices 404 (e.g., vehicle computing system), one or more sensor systems 406, one or more emitters 408, such as emitter(s) 118 and/or 120, one or more communication connections 410, at least one direct connection 412, and one or more drive systems 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device(s) 404 stores a localization component 420, a perception component 422, a planning component 424, one or more system controllers 426, and a warning signal component 428. Though depicted in FIG. 4 as residing in the memory 418 for illustrative purposes, it is contemplated that the localization component 420, a perception component 422, a planning component 424, one or more system controllers 426, and a warning signal component 428 (and/or the components and/or database illustrated therein) may additionally, or alternatively, be accessible to the vehicle 402 (e.g., stored on, or otherwise accessible by, memory remote from the vehicle 402, such as, for example, on memory 432 of one or more (remote) computing devices 430).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request / receive one or more map(s) of an environment and may continuously determine a location and/or orientation of the autonomous vehicle within the map(s). For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In at least one example, a map may include a three-dimensional mesh of the environment. In some examples, the vehicle 402 may be controlled based at least in part on the map(s). That is, the map(s) may be additionally used in connection with the perception component 422 and/or the planning component 424 to determine a location of the vehicle 402, detect objects in an environment, and/or generate routes and/or trajectories to navigate within an environment.

In some examples, the one or more maps may be stored on a remote computing device(s) (such as the computing device(s) 430) accessible via network(s) 434. In some examples, multiple maps may be stored based on, for example, a characteristic (e.g., type of entity, time of day, day of week, season of the year, etc.). Storing multiple maps may have similar memory requirements but increase the speed at which data in a map may be accessed.

In various examples, the localization component 420 may be configured to utilize SLAM (simultaneous localization and mapping), CLAMS (calibration, localization and mapping, simultaneously), relative SLAM, bundle adjustment, nonlinear least squares optimization, or the like to receive image data, lidar data, radar data, IMU data, GPS data, wheel encoder data, and the like to accurately determine a location of the vehicle 402. In some instances, the localization component 420 may provide data to various components of the vehicle 402 to determine an initial position of an autonomous vehicle 402 for determining a likelihood (e.g., probability) of conflict with an object, such as whether the object is relevant to the vehicle 402, as discussed herein.

In some examples, the perception component 422 may include functionality to perform object detection, segmentation, and/or classification. In some examples, the perception component 422 may provide processed sensor data that indicates a presence of an object (e.g., entity, dynamic object)

that is proximate to the vehicle 402 and/or a classification of the object as an object type (e.g., car, pedestrian, cyclist, dog, cat, deer, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition (e.g., rain, sleet, hail, snow, temperature, humidity, etc.), an indication of darkness/light, etc.

In general, the planning component 424 may determine a path for the vehicle 402 to follow to traverse through an environment. For example, the planning component 424 may determine various routes and planned vehicle trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the vehicle 402 along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a planned vehicle trajectory, or a portion of a planned vehicle trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects in an environment. For example, a prediction component may generate one or more predicted trajectories for objects within a threshold distance from the vehicle 402. In some examples, a prediction component may measure a trace of an object and generate a trajectory for the object based on observed and predicted behavior. In various examples, the trajectory and/or intent of an object may be determined utilizing techniques described in U.S. Pat. No. 10,414,395 and/or U.S. Pat. Application Serial No. 16/151,607, 16/504,147 and/or 15/807,521, incorporated by reference above.

In at least one example, the vehicle computing device(s) 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

As illustrated in FIG. 4, the vehicle computing device(s) 404 may include a warning signal component 428. The warning signal component 428 be configured to determine a time at which to emit a warning signal based on a vehicle trajectory, such as utilizing the techniques described herein. In various examples, the warning signal component 428 may be configured to modify a first frequency and/or first volume associated with a first warning signal to a second frequency and/or second volume associated with a second warning signal, such as that described above with regard to FIGS. 1-3.

As can be understood, the components discussed herein (e.g., the localization component 420, the perception component 422, the planning component 424, the one or more system controllers 426, the warning signal component 428 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 418 (and the memory 432, discussed below) may be implemented as a neural network. As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naive Bayes, Gaussian naive Bayes, multinomial naive Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally or alternatively, the sensor system(s) 406 may send sensor data, via the one or more networks 434, to the one or more computing device(s) 430 at a particular frequency, after a lapse of a predetermined period of time, in near real-time, etc.

The vehicle 402 may also include one or more emitters 408 for emitting light and/or sound, as described above. The emitters 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights emitted as a warning signal and/or to signal a direction of travel for an object and/or the vehicle 402 and/or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include communication connection(s) 410 that enable communication between the vehicle 402 and one or more other local or remote computing device(s) 430. For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device(s) 430, other nearby vehicles, etc.) and/or one or more remote sensor system(s) 442 for receiving sensor data.

The communications connection(s) 410 may include physical and/or logical interfaces for connecting the vehicle computing device(s) 404 to another computing device or a network, such as network(s) 434. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive system 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) 406 and to control operation of the various vehicle systems. In some examples, the drive system controller may include one or more processors and memory communicatively coupled with the one or more processors. The memory 418 may store one or more modules to perform various functionalities of the drive system(s) 414. Furthermore, the drive system(s) 414 may also include one or more communication connection(s) that enable communication by the respective drive system with one or more other local or remote computing device(s) 430.

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, and the warning signal component 428 and various components thereof, may process sensor data, as described above, and may send their respective outputs, over the one or more network(s)

434, to the computing device(s) 430. In at least one example, the localization component 420, the perception component 422, the planning component 424, the one or more system controllers 426, and the warning signal component 428 may send their respective outputs to the computing device(s) 430 at a particular frequency, after a lapse of a predetermined period of time, in near real-time, etc.

In some examples, the vehicle 402 may send sensor data to the computing device(s) 430 via the network(s) 434. In some examples, the vehicle 402 may receive sensor data from the computing device(s) 430 and/or one or more remote sensor systems 442 via the network(s) 434. The sensor data may include raw sensor data and/or processed sensor data and/or representations of sensor data. In some examples, the sensor data (raw or processed) may be sent and/or received as one or more log files.

The computing device(s) 430 may include processor(s) 436 and a memory 432 storing a map component 438, a sensor data processing component 440. In some examples, the map component 438 may include functionality to generate maps of various resolutions. In such examples, the map component 438 may send one or more maps to the vehicle computing device(s) 404 for navigational purposes. In various examples, the sensor data processing component 440 may be configured to receive data from one or more remote sensors, such as sensor systems 406 and/or remote sensor system(s) 442. In some examples, the sensor data processing component 440 may be configured to process the data and send processed sensor data to the vehicle computing device(s) 404, such as for use by the warning signal component 428. In some examples, the sensor data processing component 440 may be configured to send raw sensor data to the vehicle computing device(s) 404.

The processor(s) 416 of the vehicle 402 and the processor(s) 436 of the computing device(s) 430 may be any suitable processor capable of executing instructions to process data and perform operations as described herein. By way of example and not limitation, the processor(s) 416 and 436 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 432 are examples of non-transitory computer-readable media. The memory 418 and 432 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 432 may include at least a working memory and a storage memory. For example, the working memory may be a highspeed memory of limited capacity (e.g., cache memory) that is used for storing data to be operated on by the processor(s) 416 and 436. In some instances, the memory 418 and 432 may include a storage memory that may be a lower-speed memory of relatively large capacity that is used for long-term storage of data. In some cases, the processor(s) 416 and 436 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 430 and/or components of the computing device(s) 430 may be associated with the vehicle 402. That is, the vehicle 402 may perform one or more of the functions associated with the computing device(s) 430, and vice versa.

FIGS. 5-8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 5:
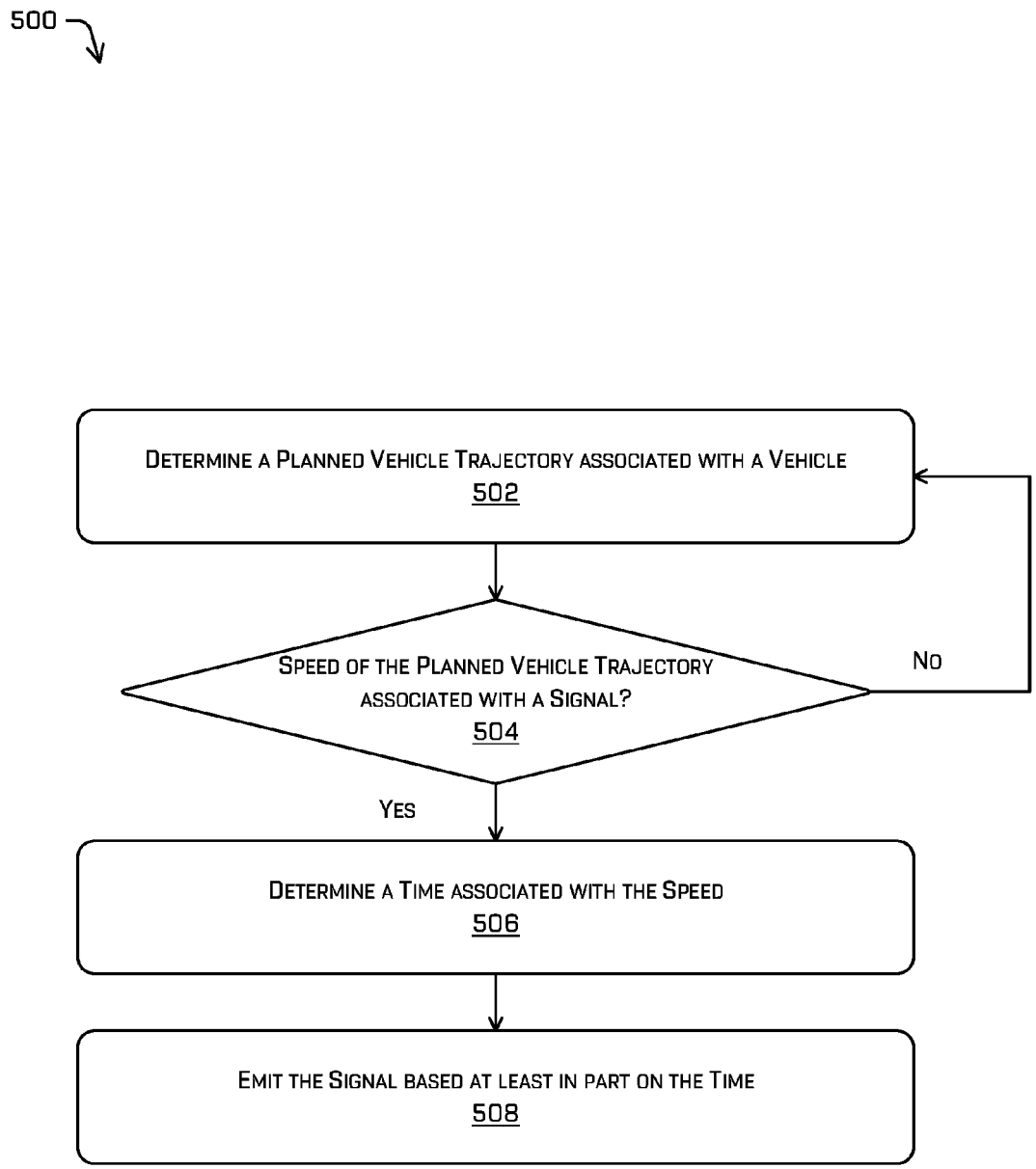
FIG. 5 depicts an example process for emitting a warning signal to alert an object in an environment of a vehicle operation.

FIG. 5 depicts an example process 500 for depicts an example process for emitting a warning signal to alert an object in an environment of a vehicle operation. For example, some or all of the process 500 may be performed by one or more components in FIG. 4, as described herein. For example, some or all of the process 500 may be performed by the vehicle computing device(s) 404.

At operation 502, the process may include determining a planned vehicle trajectory associated with a vehicle. The planned vehicle trajectory may be based on a route from a location to a destination. The planned vehicle trajectory may include a speed, a speed modification (e.g., acceleration or deceleration associated with traffic lights, stop signs, yielding for objects, etc.), position changes (e.g., change position in a lane, change lanes, etc.), direction of travel (e.g., continuing in a direction, turning, etc.), or the like. For example, the vehicle computing system may determine a planned vehicle trajectory associated with a vehicle slowing to a stop approaching a stop sign.

At operation 504, the process may include determining whether a speed of the planned vehicle trajectory is associated with a signal (e.g., a warning signal). The warning signal may include a sound emitted to alert objects in the environment of the vehicle operation. In at least one example, the warning signal may be an electric vehicle warning sound, such as that mandated by law and/or regulation in various jurisdictions. In various examples, the warning signal may include one or more frequencies and one or more volumes. In some example, the frequenc(ies) and/or volume(s) may be associated with the speed. For example, a first warning signal associated with a first speed may include a first frequency and a first volume and a second warning signal associated with a second speed may include a first frequency and a second volume. For another example, a first warning signal associated with a first speed may include a first frequency and a first volume and a second warning signal associated with a second speed may include a second frequency and a second volume.

In various examples, the frequencies and/or volumes associated with different speeds may be stored on a datastore of the vehicle computing system (e.g., on the memory 418 of vehicle computing device(s) 404). In such examples, the vehicle computing system may access the datastore to determine one or more frequencies and/or one or more volume(s) associated with the signal. In some examples, the vehicle computing system may be configured to determine the frequenc(ies) and/or volume(s) associated with a signal dynamically, such as based on one or more real-time conditions, as described above. In some examples, the vehicle computing system may modify the frequenc(ies) and/or volume(s) stored in the datastore (e.g., baseline frequenc(ies) and/or volume(s)) based on the real-time conditions. The real-time conditions may include environmental conditions (e.g., noise level in the environment, amount of traffic, road conditions, etc.), weather conditions (e.g., rain, snow, hail, wind, etc.), vehicular considerations (e.g., passengers in the vehicle, etc.), and the like. For example, the vehicle computing system may increase a volume associated with a signal based on a detected noise level in the environment being above a threshold noise level.

Based on a determination that the speed of the planned vehicle trajectory is not associated with a signal (e.g., "No" at 504), the process may include determining the planned vehicle trajectory associated with the vehicle, such as that described with regard to operation 502.

Based on a that the speed of the planned vehicle trajectory is associated with the signal (e.g., "Yes" at 504), the process, at operation 506, may include determining a time associated with the speed. In various examples, the vehicle computing system may determine that the vehicle will be at the speed associated with the signal at time. For example, the vehicle computing system may determine a time $t_1$ at which a decelerating vehicle will be at the speed associated with the signal. For another example, the vehicle computing system may determine a time $t_1$ at which an accelerating vehicle will be at the speed associated with the signal. For yet another example, the vehicle computing system may determine a time $t_1$ at which vehicle may start movement from a stopped position (e.g., the start of movement being associated with the signal, from a first velocity of zero to a second velocity greater than zero).

At operation 508, the process may include emitting the signal based at least in part on the time. In various examples, the vehicle computing system may emit the signal at the time. In some examples, the vehicle computing system may begin emitting the signal at a lower volume than a volume associated with the signal and may gradually increase the volume to emit the signal at the volume at the time. In various examples, the vehicle computing system may emit the signal via one or more emitters (e.g., speakers) associated with the vehicle.

Figure 6:
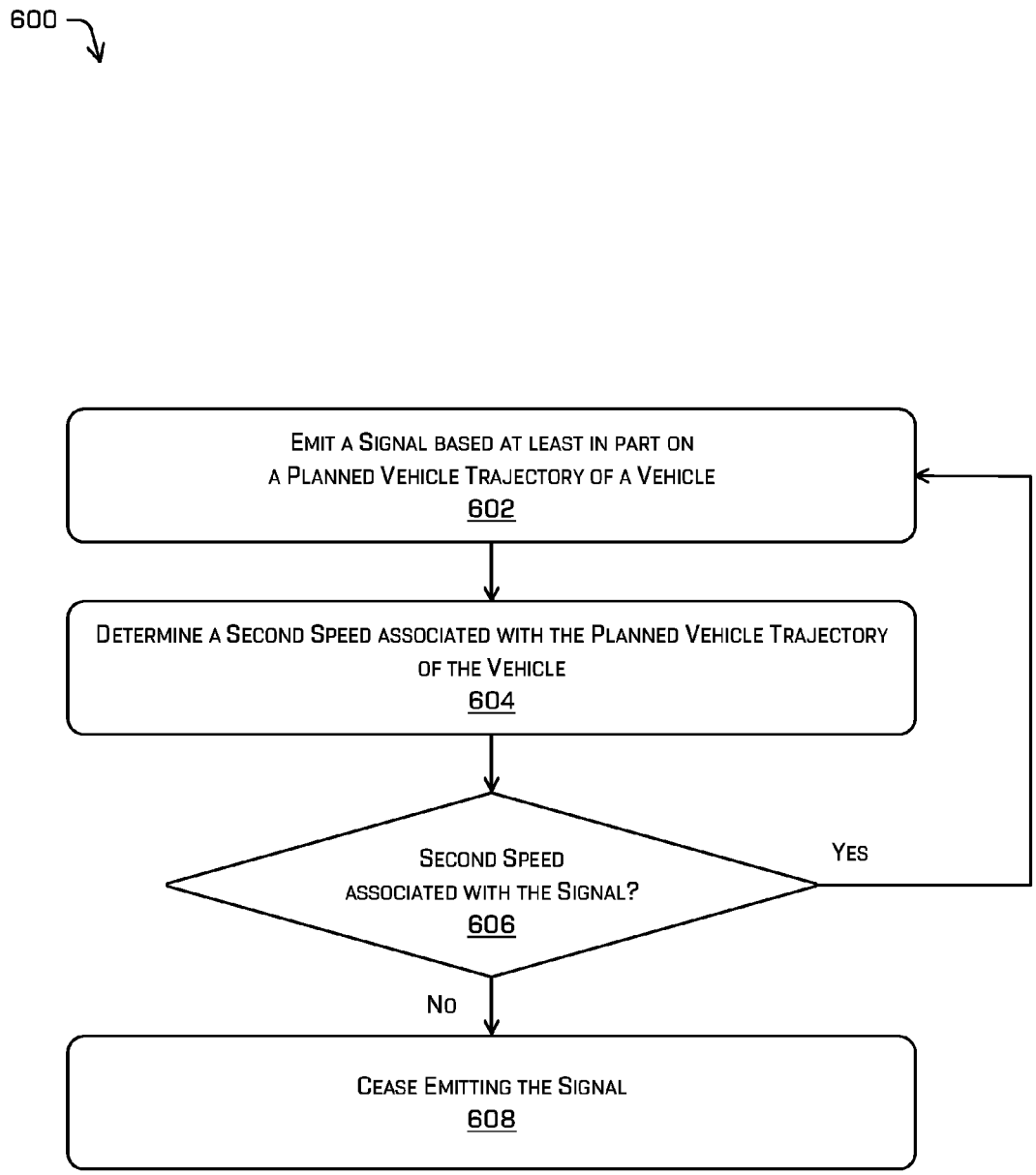
FIG. 6 depicts another example process for ceasing to emit the warning signal based on a vehicle trajectory.

FIG. 6 depicts an example process 600 for ceasing to emit a warning signal based on a vehicle trajectory. For example, some or all of the process 600 may be performed by one or more components in FIG. 4, as described herein. For example, some or all of the process 600 may be performed by the vehicle computing device(s) 404.

At operation 602, the process may include emitting a signal (e.g., warning signal) based at least in part on a planned vehicle trajectory of a vehicle. The signal may be emitted via one or more emitters of the vehicle. The planned vehicle trajectory may include a first speed associated with the signal. In various examples, the vehicle computing system may determine a first time associated with the first speed. In such examples, the first time may include a time at which the vehicle will be at the first speed. In various examples, the vehicle computing system may cause the vehicle to emit the signal based on the time. As described above, the vehicle computing system may begin emitting the signal at an interval prior to the time at a lower volume than a volume associated with the signal and may crescendo to the volume associated with the signal at the time. In some examples, the vehicle computing system may begin emitting the signal at the volume associated therewith at the time. In various examples, the vehicle computing system may begin emitting the signal at a volume above the volume associated with the signal at the time and may smoothly transition the volume down to the volume associated with the signal.

At operation 604, the process may include determining a second speed associated with the planned vehicle trajectory of the vehicle. The second speed may be a speed of one or more speeds associated with the planned vehicle trajectory, such as on a route from a location to a destination.

At operation 606, the process may include determining whether the second speed is associated with the signal. In various examples, the signal may include the signal emitted at operation 602 (e.g., same frequency and/or volume). In some examples, the signal may include a second signal comprising a second frequency (or set of frequencies) and/or a second volume (or set of volumes). In various examples, the vehicle computing system may determine that the second speed is associated with the signal based on a table of speeds and corresponding signals stored in a database accessible to the vehicle computing system. As discussed herein, the signal may include an electric vehicle warning sound, such as that mandated by law and/or regulation in various jurisdictions.

Based on a determination that second speed is associated with the signal ("Yes" at operation 606), the process may include emitting the signal based at least in part on a vehicle trajectory (e.g., the second vehicle trajectory), such as that described with regard to operation 602. In various examples, the second speed may be associated with a second signal. The second signal may include a second frequency (or set of frequencies) and/or a second volume (or set of volumes). In various examples, the vehicle computing system may determine a second time associated with the second speed. In such examples, the vehicle computing system may cause the second signal to be emitted based on the second time.

Based on a determination that ("No" at operation 606), at operation 608, the process may include ceasing to emit the signal. In various examples, the vehicle computing system may cause the signal to stop emitting via the emitters.

Figure 7:
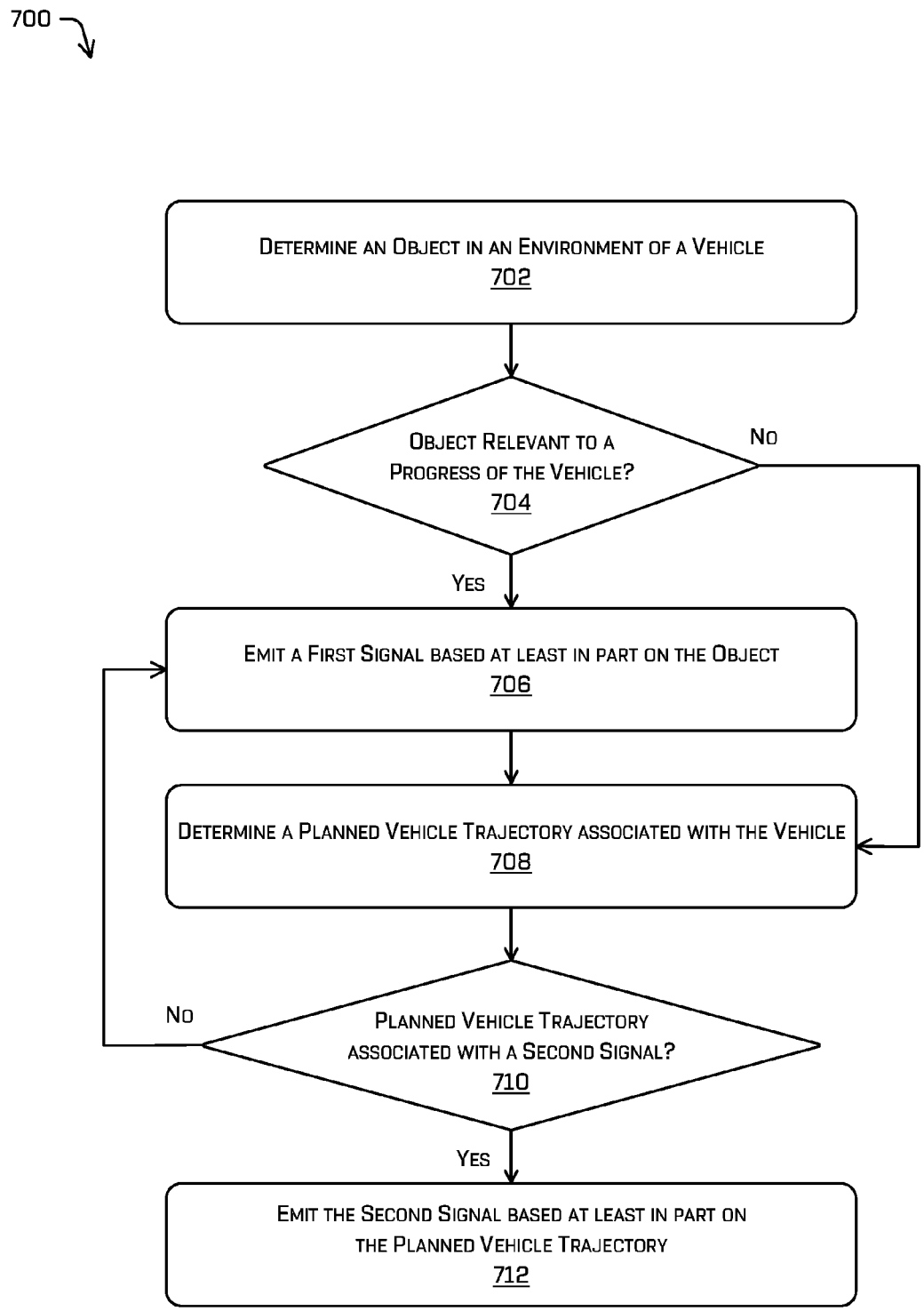
FIG. 7 depicts an example process for emitting a first warning signal based at least in part on an object in an environment and a second warning signal based on a vehicle trajectory associated with a vehicle.

FIG. 7 depicts an example process 700 for emitting a first warning signal based at least in part on an object in an environment and a second warning signal based on a vehicle trajectory associated with a vehicle. For example, some or all of the process 700 may be performed by one or more components in FIG. 4, as described herein. For example, some or all of the process 700 may be performed by the vehicle computing device(s) 404.

At operation 702, the process may include determining an object in an environment of a vehicle. In some examples, the object may be detected based on sensor data from sensors (e.g., cameras, motion detectors, lidar, radar, etc.) of the vehicle. In some examples, the object may be detected based on sensor data received from remote sensors, such as, for example, sensors associated with another vehicle or sensors mounted in an environment that are configured to share data with a plurality of vehicles.

At operation 704, the process may include determining whether the object is relevant to a progress of the vehicle (e.g., a potential conflict between the vehicle and object may exist, object may potentially slow forward progress of the vehicle). In various examples, the vehicle computing system may be configured to determine relevance of an object utilizing the techniques described in U.S. Pat. Application Serial Nos. 16/193,945, 16/389,720, 16/417,260, and 16/530,515, incorporated herein by reference above. In some examples, the determination of object relevance may be based on a location associated with the object being within a threshold distance of a path of the vehicle. In such examples, the path may correspond to a drivable surface over which the vehicle plans to travel from a first location to a destination.

In some examples, the determination of object relevance may be based on a potential trajectory of the object intersecting the vehicle trajectory. In such examples, the vehicle computing system may determine the potential object trajectory based on the sensor data, such as utilizing the techniques described in U.S. Pat. No. 10,414,395, and U.S. Pat. Application Serial Nos. 16/151,607, 15/507,147, and 15/807,521, incorporated herein by reference above. For example, the vehicle computing system may detect a pedestrian jaywalking in the road ahead of the vehicle. The vehicle computing system may determine that the pedestrian trajectory may conflict with the vehicle trajectory, such that, absent a modification to one or both trajectories, a collision between the vehicle and the pedestrian could occur.

Based on a determination that obj ect is relevant to the progress of the vehicle ("Yes" at operation 704), the process, at operation 706, may include emitting a first signal based at least in part on the object. The vehicle computing system may emit the first warning signal to warn the pedestrian of the vehicle operation on the road. In some examples, the vehicle computing system may emit the first warning signal concurrently with or immediately prior to modifying the vehicle trajectory (e.g., yielding to the pedestrian), such as to maximize safe operation of the vehicle. In various examples, the vehicle computing system may direct the first warning signal toward the relevant object. In such examples, the first warning signal may be emitted via emitters substantially facing a direction associated with the relevant object and/or may be emitted utilizing beamforming techniques, such as those described in U.S. Pat. No. 9,878,664, incorporated herein by reference above.

At operation 708, the process may include determining a planned vehicle trajectory associated with the vehicle. The planned vehicle trajectory may be based on a route from a location to a destination. The planned vehicle trajectory may include a speed, a speed modification (e.g., acceleration or deceleration associated with traffic lights, stop signs, yielding for objects, etc.), position changes (e.g., change position in a lane, change lanes, etc.), direction of travel (e.g., continuing in a direction, turning, etc.), or the like. In various examples, the planned vehicle trajectory may include a trajectory associated with yielding to the object. In such examples, the planned vehicle trajectory may include a deceleration profile (e.g., one or more decreasing speeds).

Based on a determination that the object is not relevant to the progress of the vehicle ("No" at operation 704), the process, at may include determining a planned vehicle trajectory associated with the vehicle, as described above with regard to operation 708.

At operation 710, the process may include determining whether the planned vehicle trajectory is associated with a second signal. The second signal may include a signal associated with an electric vehicle warning sound. In some examples, the planned vehicle trajectory may be associated with the second signal based on one or more speeds associated with the vehicle trajectory. For example, the planned vehicle trajectory may include a speed below a threshold speed associated with the second warning signal (e.g., 18.6 miles per hour). Based on the determination that the speed of the planned vehicle trajectory is below the threshold speed; the vehicle computing system may determine that the planned vehicle trajectory is associated with the second signal.

Based on a determination that the planned vehicle trajectory is not associated with the second signal ("No" at operation 710), the process may include determining whether the object remains relevant to the progress of the vehicle, such as that described with regard to operation 704.

Based on a determination that the planned vehicle trajectory is associated with the second signal ("Yes" at operation 710), the process, at operation 712, may include emitting the second signal based at least in part on the vehicle trajectory. The second signal may be emitted via the same or different emitters as the first signal. In some examples, the second signal and the first signal may be emitted concurrently. In some examples, one or more frequencies and/or one or more volumes associated with the first signal may be gradually modified into one or more frequencies and/or one or more volumes associated with the second signal. In such examples, the vehicle computing system may smoothly transition from emitting the first signal to emitting the second signal. In some examples, the vehicle computing system may switch from emitting the first signal to emitting the second signal, such that at a first moment the first signal is emitted and at a second moment, the second signal is emitted.

Figure 8:
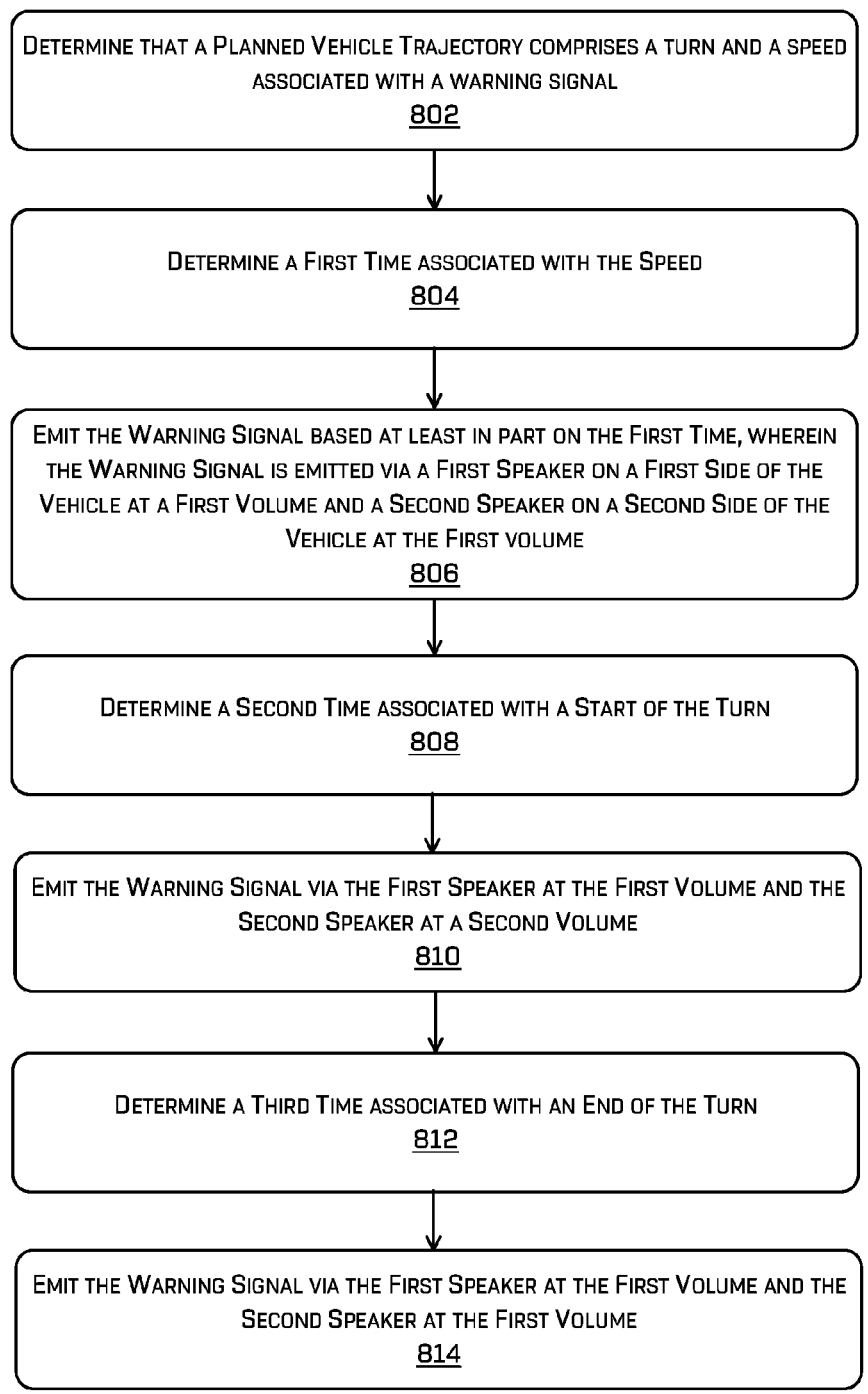
FIG. 8 depicts an example process for emitting a warning signal via different emitters at different volumes based in part on a vehicle trajectory.

FIG. 8 depicts an example process 800 for emitting a warning signal via different speakers at different volumes based in part on a vehicle trajectory. For example, some or all of the process 800 may be performed by one or more components in FIG. 4, as described herein. For example, some or all of the process 800 may be performed by the vehicle computing device(s) 404.

At operation 802, the process may include determining that a planned vehicle trajectory includes a turn and a speed associated with a warning signal. The turn may represent a change of direction, such as that described above with regard to FIG. 3. In various examples, the vehicle computing system may determine that the speed is associated with the warning signal (e.g., signal) based on a table of speeds and corresponding signals stored in a database accessible to the vehicle computing system. The corresponding signals may include signals for alerting objects in the environment of the vehicle operation.

At operation 804, the process may include determining a first time associated with the speed. The first time may include a time at which the vehicle will be traveling the speed associated with the signal. The time may be determined based on an initial speed, a deceleration rate, and other factors associated with the vehicle trajectory and/or environment.

At operation 806, the process may include emitting the warning signal based at least in part on the first time, wherein the warning signal is emitted via a first speaker on a first side of the vehicle at a first volume and a second speaker on a second side of the vehicle at the first volume.

At operation 808, the process may include determining a second time associated with a start of the turn. In some examples, the start of the turn may correspond to a moment at which the vehicle computing device sends a signal to one or more drive systems, such as drive system(s) 414, to cause the vehicle to change a direction of travel. In some examples, the start of the turn may correspond to the moment at which the drive system(s) cause the direction of travel to be modified.

At operation 810, the process may include emitting the warning signal via the first speaker at the first volume and the second speaker at a second volume. In various examples, the speaker (e.g., first speaker or second speaker) associated with an outboard side of vehicle during the turn (e.g., outside of turn, side opposite the turn direction) may emit a louder warning signal than the speaker associated with the inboard side of the vehicle during the turn, or vice versa. The warning signal emission at different volumes may provide objects with an auditory awareness of the vehicle action. As such, an object proximate the vehicle would not necessarily need to view the turn to understand that the vehicle is turning, thereby improving safe operation of the vehicle. Though described as emitting different signals via emitters on different sides of the vehicle, the different signals may additionally or alternatively be emitted via forward and rear facing speakers. For example, a first signal may be emitted via forward facing speakers and a second signal may be emitted via rear facing speakers. For another example, a first signal may be emitted via a first forward facing speaker on a first side of the vehicle, a second signal may be emitted via a second forward facing speaker on a second side of the vehicle, a third signal may be emitted via a first rearward facing speaker on the second side of the vehicle, and a fourth signal may be emitted via a second rearward facing speaker on the first side of the vehicle.

At operation 812, the process may include determining a third time associated with an end of the turn. In some examples, the end of the turn may correspond to a moment at which the vehicle computing device sends a signal to the drive system(s) to cause the vehicle to stop the turn and proceed straight. In some examples, the end of the turn may correspond to the moment at which the drive system(s) cause the vehicle to proceed straight.

At operation 814, the process may include emitting the warning signal via the first speaker at the first volume and the second speaker at the first volume. The vehicle computing system may cause the warning signal to be emitted at a substantially uniform volume to alert objects in the environment of the vehicle operation. The vehicle computing system may continue to emit the warning signal until determining that the vehicle trajectory includes a speed that is not associated with the warning signal.

EXAMPLE CLAUSES

A: A vehicle comprising: a speaker; one or more processors; and one or more computer-readable media storing instructions that, when executed, configure the vehicle to: determine a planned vehicle trajectory associated with the vehicle, wherein the planned vehicle trajectory comprises one or more speeds and one or more directions of travel of the vehicle at a time in the future; determine that a speed of the planned vehicle trajectory is associated with a signal; determine a time associated with the speed; and emit, via the speaker and based at least in part on the time, a sound associated with the signal.

B: The vehicle as paragraph A describes, further comprising a sensor, wherein the signal is a first signal, the sound is a first sound, the time is a first time, and wherein the instructions further configure the vehicle to: determine, based at least in part on sensor data from the sensor at a second time before the first time, an object in an environment associated with the vehicle; determine, based at least in part on the sensor data, an object trajectory associated with the object; determine, based at least in part on the object trajectory, that the object is relevant to a progress of the vehicle; emit, via the speaker and based at least in part on determining that the object is relevant to the progress of the vehicle, a second sound associated with a second signal; and at a third time after the second time and before the first time, modify at least one of a frequency or a volume of the second sound to transition into the first sound based at least in part on the first time.

C: The vehicle as either paragraph A or paragraph B describes, wherein the speed is a first speed, the signal is a first signal, the sound is a first sound, the time is a first time, and wherein the instructions further configure the vehicle to: determine that a second speed associated with the planned vehicle trajectory is associated with a second signal; determine a second time associated with the second speed; and emit, via the speaker and based at least in part on the second time, a second sound associated with the second signal, wherein the first sound comprises a first frequency and a first volume and the second sound comprises a second frequency and a second volume.

D: The vehicle as any one of paragraphs A-C describe, wherein the time is a first time and wherein the instructions further configure the vehicle to: determine that the planned vehicle trajectory is associated with a movement of the vehicle from a stopped position, wherein the sound is further emitted at a second time prior to the first time.

E: The vehicle as any one of paragraphs A-D describe, wherein the planned vehicle trajectory comprises a turn, the sound comprises a first sound, the vehicle comprises a first speaker on a first side of the vehicle and a second speaker on a second side of the vehicle, and wherein the instructions further configure the vehicle to:; emit the first sound from the first speaker and the second speaker based at least in part on the speed; determine a first time associated with a start of the turn; emit the first sound from the first speaker and a second sound from the second speaker based at least in part on the first time; determine a second time associated with an end of the turn; and emit the first sound from the first speaker and the second speaker based at least in part on the second time.

F: A method comprising: determining a planned vehicle trajectory associated with a vehicle; determining, based at least in part on a speed associated with the planned vehicle trajectory, a signal; determining a time associated with the speed; and emitting the signal based at least in part on the time.

G: The method as paragraph F describes, wherein the signal is a first signal and the time is a first time, the method further comprising: determining, based at least in part on sensor data from a sensor, an object in an environment associated with the vehicle; determining that the object is relevant to a progress of the vehicle; emitting, at a second time before the first time, a second signal based at least in part on determining that the object is relevant to the progress of the vehicle, the second signal comprising a frequency and a volume; and at a third time after the second time and before the first time, modifying at least one of the frequency or the volume of the second signal to transition into emitting the first signal based at least in part on the first time.

H: The method as either paragraph F or paragraph G describes, wherein the signal is a first signal, the method further comprising: determining, based at least in part on sensor data from a sensor, an object in an environment associated with the vehicle; determining that the object is relevant to a progress of the vehicle; and emitting a second signal at a second time based at least in part on determining that the object is relevant to the progress of the vehicle, wherein the first signal is emitted via a first emitter and the second signal is emitted via a second emitter.

I: The method as any one of paragraphs F-H describe, wherein the planned vehicle trajectory comprises a turn, the signal comprises a first signal, the method further comprising: emit the first signal from a first emitter on the first side of the vehicle and a second emitter on a second side of the vehicle based at least in part on the speed; determine a first time associated with a start of the turn; emit the first signal via the first emitter and a second signal via the second emitter based at least in part on the first time; determine a second time associated with an end of the turn; and emit the first signal via the first emitter and the second emitter based at least in part on the second time.

J: The method as any one of paragraphs F-I describe, wherein the time is a first time, the method further comprising: determining that a second speed associated with the planned vehicle trajectory is above a threshold speed; determining a second time associated with the second speed; and causing an emitter to cease emitting the signal based at least in part on the second time and determining that the second speed being above the threshold speed.

K: The method as any one of paragraphs F-J describe, wherein at least one of a frequency or a volume of the signal is based at least in part on at least one of: an environmental condition in an environment of the vehicle; a weather condition in the environment; a location of the vehicle in the environment; a speed of the vehicle in the environment; a time of day in which the vehicle is operating; a time of year in which the vehicle is operating; or a day in a week in which the vehicle is operating.

L: The method as any one of paragraphs F-K describe, wherein the time is a first time, the method further comprising: determining that the planned vehicle trajectory is associated with a movement of the vehicle from a stopped position, wherein the signal is emitted at a second time prior to the first time.

M: The method as any one of paragraphs F-L describe, further comprising: determining, based at least in part on sensor data from a sensor, an object in an environment associated with the vehicle; and determining that the object is within a threshold distance of the vehicle, wherein emitting the signal is further based at least in part on determining that the object is within the threshold distance.

N: The method as any one of paragraphs F-M describe, wherein the speed is a first speed, the signal is a first signal, the time is a first time, and wherein the method further comprises: determining that a second speed associated with the planned vehicle trajectory is associated with a second signal; determining a second time associated with the second speed; and emitting the second signal based at least in part on the second time, wherein the first signal comprises a first frequency and a first volume and the second signal comprises a second frequency and a second volume.

O: A system or device comprising: a processor; and a non-transitory computer-readable medium storing instructions that, when executed, cause a processor to perform a computer-implemented method as any one of paragraphs F-N describe.

P: A system or device comprising: a means for processing; and a means for storing coupled to the means for processing, the means for storing including instructions to configure one or more devices to perform a computer-implemented method as any one of paragraphs F-N describe.

Q: One or more non-transitory computer-readable media storing instructions that, when executed, cause a vehicle to perform operations comprising: determining a planned vehicle trajectory associated with a vehicle; determining that a speed associated with the planned vehicle trajectory is associated with a signal; determining a time associated with the speed; and emitting the signal based at least in part on the time.

R: One or more non-transitory computer-readable media as paragraph Q describes, wherein the time is a first time, the operations further comprising: determining that the planned vehicle trajectory is associated with a movement of the vehicle from a stopped position, wherein the signal is further emitted at a second time prior to the first time.

S: One or more non-transitory computer-readable media as either paragraph Q or paragraph R describes, wherein the speed is a first speed, the signal is a first signal, the time is a first time, and wherein the operations further comprise: determining that a second speed associated with the planned vehicle trajectory is associated with a second signal; determining a second time associated with the second speed; and emitting the second signal based at least in part on the second time, wherein the first signal comprises a first frequency and a first volume and the second signal comprises a second frequency and a second volume.

T: One or more non-transitory computer-readable media as any one of paragraphs Q-S describe, wherein the signal is a first signal and the time is a first time, the operations further comprising: determining, based at least in part on sensor data from a sensor, an object in an environment associated with the vehicle; determining that the object is relevant to a progress of the vehicle; emitting, at a second time before the first time, a second signal based at least in part on determining that the object is relevant to the progress of the vehicle, the second signal comprising a frequency and a volume; and at a third time after the second time and before the first time, modifying at least one of the frequency or the volume of the second signal to transition into emitting the first signal based at least in part on the first time.

U: One or more non-transitory computer-readable media as any one of paragraphs Q-T describe, wherein the signal is a first signal, the operations further comprising: determining, based at least in part on sensor data from a sensor, an object in an environment associated with the vehicle; determining that the object is relevant to a progress of the vehicle; and emitting a second signal at a second time based at least in part on determining that the object is relevant to the progress of the vehicle, wherein the first signal is emitted via a first emitter and the second signal is emitted via a second emitter.

V: One or more non-transitory computer-readable media as any one of paragraphs Q-U describe, wherein the time is a first time, the operations further comprising: determining that a second speed associated with the planned vehicle trajectory is above a threshold speed; determining a second time associated with the second speed; and causing an emitter to cease emitting the signal based at least in part on the second time and determining that the second speed being above the threshold speed.

While the example clauses described above are described with respect to one particular implementation, it should be understood that, in the context of this document, the content of the example clauses may also be implemented via a method, device, system, a computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a speaker;
   one or more processors; and
   one or more non-transitory computer-readable media storing instructions that, when executed, configure the vehicle to:
   determine a planned vehicle trajectory associated with the vehicle, wherein the planned vehicle trajectory comprises one or more speeds and one or more directions of travel of the vehicle at a time in the future;
   determine that a threshold speed of the planned vehicle trajectory is associated with a signal;
   determine a time associated with the vehicle reaching the threshold speed; and
   emit, continuously via the speaker and based at least in part on the time, a sound associated with the signal while the vehicle is at the threshold speed and at all speeds below the threshold speed.

2. The vehicle of claim 1, further comprising a sensor, wherein the signal is a first signal, the sound is a first sound, the time is a first time, and wherein the instructions further configure the vehicle to:
   determine, based at least in part on sensor data from the sensor at a second time before the first time, an object in an environment associated with the vehicle;
   determine, based at least in part on the sensor data, an object trajectory associated with the object;
   determine, based at least in part on the object trajectory, that the object is relevant to a progress of the vehicle;
   emit, via the speaker and based at least in part on determining that the object is relevant to the progress of the vehicle, a second sound associated with a second signal; and
   at a third time after the second time and before the first time, modify at least one of a frequency or a volume of the second sound to transition into the first sound based at least in part on the first time.

3. The vehicle of claim 1, wherein the threshold speed is a first threshold speed, the signal is a first signal, the sound is a first sound, the time is a first time, and wherein the instructions further configure the vehicle to:
   determine that a second threshold speed associated with the planned vehicle trajectory is associated with a second signal;
   determine a second time associated with the second threshold speed; and
   emit, via the speaker and based at least in part on the second time, a second sound associated with the second signal, wherein the first sound comprises a first frequency and a first volume and the second sound comprises a second frequency and a second volume.

4. The vehicle of claim 1, wherein the time is a first time and wherein the instructions further configure the vehicle to:
   determine that the planned vehicle trajectory is associated with a movement of the vehicle from a stopped position, wherein the sound is further emitted at a second time prior to the first time.

5. The vehicle of claim 1, wherein the planned vehicle trajectory comprises a turn, the sound comprises a first sound, the vehicle comprises a first speaker on a first side of the vehicle and a second speaker on a second side of the vehicle, and wherein the instructions further configure the vehicle to:
   emit the first sound from the first speaker and the second speaker based at least in part on the speed;
   determine a first time associated with a start of the turn;
   emit the first sound from the first speaker and a second sound from the second speaker based at least in part on the first time;
   determine a second time associated with an end of the turn; and
   emit the first sound from the first speaker and the second speaker based at least in part on the second time.

6. A method comprising:
   determining, using one or more processors, a planned vehicle trajectory associated with a vehicle;
   determining, using the one or more processors and based at least in part on a threshold speed associated with the planned vehicle trajectory, a signal;
   determining, using the one or more processors, a time associated with the vehicle reaching the threshold speed; and
   emitting continuously, using a speaker, the signal based at least in part on the time while the vehicle is at the threshold speed and at all speeds below the threshold speed.

7. The method of claim 6, wherein the signal is a first signal and the time is a first time, the method further comprising:
   determining, based at least in part on sensor data from a sensor, an object in an environment associated with the vehicle;
   determining that the object is relevant to a progress of the vehicle;
   emitting, at a second time before the first time, a second signal based at least in part on determining that the object is relevant to the progress of the vehicle, the second signal comprising a frequency and a volume; and at a third time after the second time and before the first time, modifying at least one of the frequency or the volume of the second signal to transition into emitting the first signal based at least in part on the first time.

8. The method of claim 6, wherein the signal is a first signal, the method further comprising:
    determining, based at least in part on sensor data from a sensor, an object in an environment associated with the vehicle;
    determining that the object is relevant to a progress of the vehicle; and
    emitting a second signal at a second time based at least in part on determining that the object is relevant to the progress of the vehicle,
    wherein the first signal is emitted via a first emitter and the second signal is emitted via a second emitter.

9. The method of claim 6, wherein the planned vehicle trajectory comprises a turn, the signal comprises a first signal, the method further comprising:
    emit the first signal from a first emitter on a first side of the vehicle and a second emitter on a second side of the vehicle based at least in part on the speed;
    determine a first time associated with a start of the turn;
    emit the first signal via the first emitter and a second signal via the second emitter based at least in part on the first time;
    determine a second time associated with an end of the turn; and
    emit the first signal via the first emitter and the second emitter based at least in part on the second time.

10. The method of claim 6, wherein the time is a first time, the method further comprising:
    determining that a second threshold speed associated with the planned vehicle trajectory is above the threshold speed;
    determining a second time associated with the second threshold speed; and
    causing an emitter to cease emitting the signal based at least in part on the second time and determining that the second threshold speed being above the threshold speed.

11. The method of claim 6, wherein at least one of a frequency or a volume of the signal is based at least in part on at least one of:
    an environmental condition in an environment of the vehicle;
    a weather condition in the environment;
    a location of the vehicle in the environment;
    a speed of the vehicle in the environment;
    a time of day in which the vehicle is operating;
    a time of year in which the vehicle is operating; or
    a day in a week in which the vehicle is operating.

12. The method of claim 6, wherein the time is a first time, the method further comprising:
    determining that the planned vehicle trajectory is associated with a movement of the vehicle from a stopped position,
    wherein the signal is emitted at a second time prior to the first time.

13. The method of claim 6, further comprising:
    determining, based at least in part on sensor data from a sensor, an object in an environment associated with the vehicle; and
    determining that the object is within a threshold distance of the vehicle,
    wherein emitting the signal is further based at least in part on determining that the object is within the threshold distance.

14. The method of claim 6, wherein the threshold speed is a first threshold speed, the signal is a first signal, the time is a first time, and wherein the method further comprises:
    determining that a second threshold speed associated with the planned vehicle trajectory is associated with a second signal;
    determining a second time associated with the second threshold speed; and
    emitting the second signal based at least in part on the second time,
    wherein the first signal comprises a first frequency and a first volume and the second signal comprises a second frequency and a second volume.

15. One or more non-transitory computer-readable media storing instructions that, when executed, cause a vehicle to perform operations comprising:
    determining, using one or more processors, a planned vehicle trajectory associated with the vehicle;
    determining, using the one or more processors, that a threshold speed associated with the planned vehicle trajectory is associated with a signal;
    determining, using the one or more processors, a time associated with the vehicle reaching the threshold speed; and
    emitting continuously, using a speaker, the signal based at least in part on the time while the vehicle is at the threshold speed and at all speeds below the speed.

16. The one or more non-transitory computer-readable media of claim 15, wherein the time is a first time, the operations further comprising:
    determining that the planned vehicle trajectory is associated with a movement of the vehicle from a stopped position,
    wherein the signal is further emitted at a second time prior to the first time.

17. The one or more non-transitory computer-readable media of claim 15, wherein the threshold speed is a first threshold speed, the signal is a first signal, the time is a first time, and wherein the operations further comprise:
    determining that a second threshold speed associated with the planned vehicle trajectory is associated with a second signal;
    determining a second time associated with the second threshold speed; and
    emitting the second signal based at least in part on the second time,
    wherein the first signal comprises a first frequency and a first volume and the second signal comprises a second frequency and a second volume.

18. The one or more non-transitory computer-readable media of claim 15, wherein the signal is a first signal and the time is a first time, the operations further comprising:
    determining, based at least in part on sensor data from a sensor, an object in an environment associated with the vehicle;
    determining that the object is relevant to a progress of the vehicle;
    emitting, at a second time before the first time, a second signal based at least in part on determining that the object is relevant to the progress of the vehicle, the second signal comprising a frequency and a volume; and
    at a third time after the second time and before the first time, modifying at least one of the frequency or the volume of the second signal to transition into emitting the first signal based at least in part on the first time.

19. The one or more non-transitory computer-readable media of claim 15, wherein the signal is a first signal, the operations further comprising:

determining, based at least in part on sensor data from a sensor, an object in an environment associated with the vehicle;

determining that the object is relevant to a progress of the vehicle; and emitting a second signal at a second time based at least in part on determining that the object is relevant to the progress of the vehicle, wherein the first signal is emitted via a first emitter and the second signal is emitted via a second emitter.

20. The one or more non-transitory computer-readable media of claim 15, wherein the time is a first time, the operations further comprising:

determining that a second threshold speed associated with the planned vehicle trajectory is above the threshold speed;

determining a second time associated with the second threshold speed; and causing an emitter to cease emitting the signal based at least in part on the second time and determining that the second threshold speed being above the threshold speed.

* * * * *